(12) United States Patent
Volkerink et al.

(10) Patent No.: US 11,885,644 B1
(45) Date of Patent: Jan. 30, 2024

(54) SENSOR FORM FACTORS IN HOSTILE ENVIRONMENTS

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 127 days.

(21) Appl. No.: 17/449,845

(22) Filed: Oct. 4, 2021

Related U.S. Application Data

(63) Continuation-in-part of application No. 17/468,645, filed on Sep. 7, 2021.

(60) Provisional application No. 63/086,905, filed on Oct. 2, 2020, provisional application No. 63/081,887, filed on Sep. 22, 2020, provisional application No. 63/075,135, filed on Sep. 5, 2020.

(51) Int. Cl.
*G06K 19/07* (2006.01)
*G01D 11/30* (2006.01)
*H04W 4/38* (2018.01)
*H04W 84/18* (2009.01)

(52) U.S. Cl.
CPC ......... *G01D 11/30* (2013.01); *G06K 19/0717* (2013.01); *H04W 4/38* (2018.02); *H04W 84/18* (2013.01)

(58) Field of Classification Search
CPC .................................................. G06K 19/0717
USPC .......... 235/488, 492, 439; 340/572.1, 539.26
See application file for complete search history.

(56) References Cited

U.S. PATENT DOCUMENTS

| | | |
|---|---|---|
| 2004/0075616 A1 | 4/2004 | Endo et al. |
| 2008/0122631 A1 | 5/2008 | Kodukula et al. |
| 2010/0314443 A1 | 12/2010 | Cudzilo |
| 2011/0101108 A1 | 5/2011 | Slikkerveer et al. |
| 2012/0260747 A1* | 10/2012 | Chen .................. B81C 1/00293 73/863 |
| 2015/0248604 A1 | 9/2015 | Diorio et al. |
| 2016/0273973 A1* | 9/2016 | Larsen ................... G01K 13/02 |
| 2019/0244075 A1* | 8/2019 | Khoche ................... B32B 37/12 |
| 2020/0151655 A1 | 5/2020 | Khoche |

FOREIGN PATENT DOCUMENTS

| | | |
|---|---|---|
| JP | 2003-209421 A | 7/2003 |
| WO | WO 2019/118440 A1 | 6/2019 |

OTHER PUBLICATIONS

International Search Report and Written Opinion of the International Searching Authority for International Patent Application No. PCT/US2021/049325 dated Dec. 16, 2021, 13 pages.

* cited by examiner

Primary Examiner — Suezu Ellis

(57) ABSTRACT

A tape node includes a substrate supporting electronic components for communicating wirelessly and collecting sensor data. Tape nodes may be attached to stationary or moving objects and may be combined in a network for communicating information to a network service about the objects. Tape nodes have a specialized form factor for operating in hostile environments where sensors may be placed in the hostile environment while sensitive electronics and communications interfaces may be placed away from the hostile environment in an ambient environment.

20 Claims, 14 Drawing Sheets

SENSOR FORM FACTORS IN HOSTILE ENVIRONMENTS

CROSS-REFERENCE TO RELATED APPLICATIONS

This application is a Continuation-In-Part of U.S. Ser. No. 17/468,645, filed on Sep. 7, 2021, and titled "Wireless Vibration Monitoring Sensor Device with Flexible Form Factor," which claims priority from U.S. Provisional Application Ser. No. 63/075,135, filed Sep. 5, 2020, and from U.S. Provisional Application Ser. No. 63/081,887, filed Sep. 22, 2020, and claims priority from U.S. Provisional Application Ser. No. 63/086,905 filed Oct. 2, 2020 and titled CAPTURING SENSOR DATA USING FORM FACTORS IN HOSTILE ENVIRONMENTS, each of which are incorporated by reference in their entirety.

FIELD OF THE DISCLOSURE

The disclosure generally relates to capturing sensor data and more particularly to capturing sensor data using form factors in hostile environments.

BACKGROUND

A variety of assets must be maintained in particular conditions in order to maintain quality or safety requirements for the asset. Often, these conditions must be maintained even when the asset is in a hostile environment that varies greatly in some degree from the particular conditions. For example, vaccines may be maintained at temperatures between −50° C. and −15° C. during transport when the outside temperature is much higher than the required temperature. In other examples, assets may require high heat or extreme cold or may be associated with radiation, high vibration, electromagnetic fields. Assets may also pose chemical or explosive risks, or may be inaccessible to conventional sensors. In hostile environments, it is difficult to capture sensor data safely and accurately, as conventional electronic components are susceptible to failure within the hostile environments, or may be unable to perform certain functions. However, failing to capture sensor data can result in unknown events impacting the quality or safety of the asset. For example, a spike in temperature may reduce the efficiency of vaccines during transport if undetected and uncorrected.

SUMMARY

In an aspect, a sensor product for hostile environments includes a substrate configured to support electronic components and having (a) a first portion comprising a first fraction of a length of the substrate and supporting electronic components configured to operate within an ambient environment; (b) a second portion comprising a second fraction of the length of the substrate and supporting electronic components configured to operate within a hostile environment; and (c) a flexible connecting portion comprising a remaining fraction of the length of the substrate and configured to physically connect the first portion and the second portion. The sensor product may be referred to as a tape node.

In another aspect, a wireless sensing system includes a first tape node configured to operate within a hostile environment, the first tape node including (a) a first portion comprising a first fraction of a length of the substrate and supporting electronic components and a first wireless communications device configured to operate within an ambient environment; (b) a second portion comprising a second fraction of the length of the substrate and supporting electronic components configured to operate within a hostile environment; and (c) a flexible connecting portion comprising a remaining fraction of the length of the substrate and configured to physically connect the first portion and the second portion; and a second tape node configured to operate within ambient conditions, the second tape node comprising a second wireless communications device configured to receive transmissions from the first wireless communications device.

In either of the above embodiments, one or more tape nodes have specialized form factors configured to collect sensor data in hostile environments. The specialized form factors comprise, for example, a specialized shape such that the tape node is able to fit into narrow areas or corners of assets that conventional sensors are unable to reach. In other examples, specialized form factors are shaped such that portions or components of the tape nodes capable of withstanding hostile environments interface directly with the hostile environment to capture accurate sensor data, while other portions or components of the tape node, such as electronic components, are not exposed to the hostile environment.

In any of the embodiments, electronic components configured to operate within the ambient environment may include one or more processing components or one or more communications components.

In further embodiments, the electronic components configured to operate within the hostile environment include one or more sensors configured to capture sensor data. Further, the one or more sensors may include any or all of a temperature sensor, an acoustics sensor, an optical sensor, an accelerometer, or a vibration sensor. In embodiments, the electronic components configured to operate within the hostile environment may include a low-power communications component.

In embodiments, a tape node substrate includes top and bottom surfaces, and either or both of the first and second portions include a flexible substrate with adhesive on a top or bottom surface.

In embodiments, the first and second portions are electrically connected by the flexible connecting portion, which may be configured to operate in both the ambient and hostile environments.

In an embodiment, the wireless sensing system comprises a pair of tape nodes. A first tape node is specialized to withstand hostile environments and is adhered or affixed to an asset to interface with the hostile environment (e.g., in an oven reaching high temperatures). The first tape node comprises one or more sensors for collecting sensor data within the hostile environment and wireless communications capability for communicating to a second tape node. The second tape node is adhered or affixed externally from the hostile environment (e.g., on the outside of the oven at room temperature) and is configured to receive communications from the first tape node. In some embodiments, the second tape node is further configured to store the received sensor data. In some embodiments, the second tape node is further configured to transmit the received sensor data to the wireless sensing system (e.g., one or more additional tape nodes within the wireless sensing system, a user device associated with the wireless sensing system, or the like).

In embodiments, the second portion of the sensor product is configured to be resistant to the hostile environment and includes, for example, one or more of heat-resistant material, chemical-resistant material, reinforcing material and padding. In embodiments, the hostile environment includes one or more of high temperatures, low temperatures, radiation, light exposure, high vibration, high air pressure, low air pressure, water, high water pressure, low water pressure humidity, electromagnetic fields or electrical interference, chemical or explosive risks, or a vacuum. In further embodiments, the hostile environment comprises a container for maintaining an asset in a hostile environment, the first portion of the substrate is adhered to an external surface of the container, and the second portion of the substrate is adhered to an internal surface of the container. Further, the flexible connecting portion is configured to bend, be closed in a door, inserted through an opening, or epoxied in place.

In some embodiments where establishing a connection between the first and second tape nodes of a wireless sensing system is difficult in the hostile environment, the first tape node is configured to store sensor data locally while within a hostile environment and to transmit the stored sensor data to the second tape node after a connection is re-established (e.g., upon exiting the hostile environment). In some embodiments, the first tape node is configured to store the sensor data locally on a memory of the first tape node for a set time interval or responsive to detecting a use mode.

In embodiments, the first and second wireless communications devices of a wireless sensing system provide low-range wireless communications, and the second tape node further comprises a third wireless communications device for transmitting, to a network service, transmissions received by the second wireless communications device from the first wireless communications device.

In some embodiments, a tape node with a specialized form factor is a bolt with electronic components contained within the metal body of the bolt, enabling the electronics to withstand hostile environments such as close proximity to burning oil. In some embodiments, a tape node with a specialized form factor is a sealant storing electronic components and sensors between two objects. In some embodiments, a tape node with a specialized form factor wherein width of the second portion is less that width of the first portion, for example, a metal needle or probe containing electronic components. In some embodiments, a tape node with a specialized form factor is configured such that a narrow portion of the tape node can be threaded into a hole or port on an asset while a wider portion of the tape node rests outside of the hole or port.

In some embodiments, specialized form factors have separate communications systems, thicker components, additional battery power, or other modifications to accurately capture sensor data in hostile environments.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "wireless node" or "tape node" may be used interchangeably in certain contexts, and refer to an adhesive tape platform or a segment thereof that is equipped with a sensor, processor, memory, energy source/harvesting mechanism, and wireless communications functionality, where the adhesive product has a variety of different form factors, including a multilayer roll or a sheet that includes a plurality of divisible adhesive segments. Once deployed, each tape node or wireless node can function, for example, as an adhesive tape, label, sticker, decal, or the like, and as a wireless communications device. A "peripheral" tape node or wireless node, also referred to as an outer node, leaf node, or terminal node, refers to a node that does not have any child nodes.

In certain contexts, the terms "wireless sensing system," "hierarchical communications network," "distributed agent operating system," and the like are used interchangeably herein to refer to a system or network of wireless nodes.

Figure 1A:
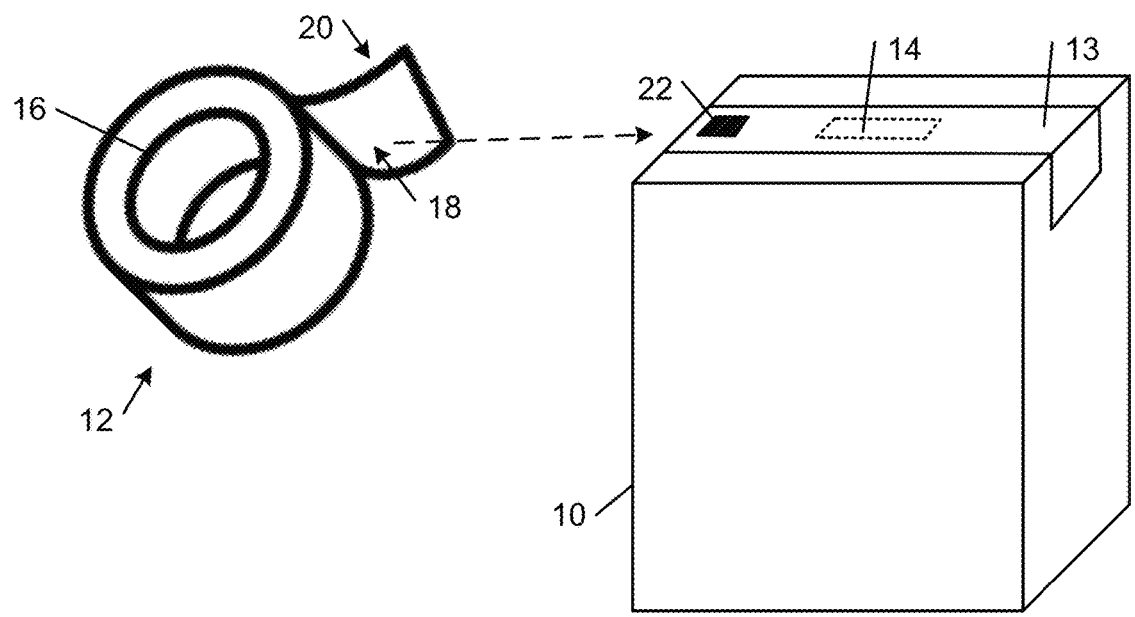
FIG. 1A is a diagrammatic view of an asset that has been sealed for shipment using a segment of an example adhesive tape platform dispensed from a roll, in embodiments.

FIG. 1A shows an example asset 10 that is sealed for shipment using an example adhesive tape platform 12 that includes embedded components of a wireless transducing circuit 14 (collectively referred to herein as a "tape node"). In this example, a segment 13 of the adhesive tape platform 12 is dispensed from a roll 16 and affixed to the asset 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the asset 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
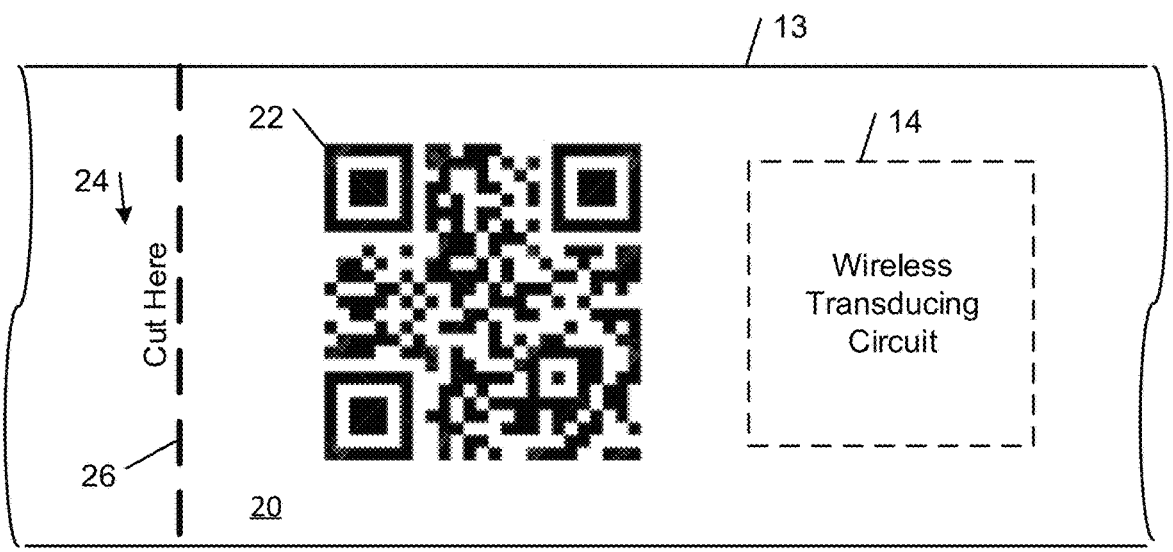
FIG. 1B is a diagrammatic top view of a portion of the segment of the example adhesive tape platform shown in FIG. 1A, in embodiments.

Referring to FIG. 1B, in some examples, the non-adhesive side 20 of the segment 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the segment 13 of the adhesive tape platform 12 includes a two-dimensional bar code (e.g., a QR Code) 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive tape platform 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any active components of the wireless transducing circuit 14. The spacing between the wireless transducing circuit 14 and the cut lines 26 may vary depending on the intended communication, transducing and/or adhesive taping application. In the example illustrated in FIG. 1A, the length of the adhesive tape platform 12 that is dispensed to seal the asset 10 corresponds to a single segment of the adhesive tape platform 12. In other examples, the length of the adhesive tape platform 12 needed to seal an asset or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or applying the length of the adhesive tape platform to the asset 10.

In some examples, components of wireless transducing circuit 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 14 in one or more segments of the adhesive tape platform 12 in response to being separated from the adhesive tape platform 12 (e.g., along the cut line 26).

In some examples, each segment 13 of the adhesive tape platform 12 includes its own respective energy source including energy harvesting elements that can harvest energy from the environment. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the wireless transducing circuit 14 in all of the segments 13 in the given length of the adhesive tape platform 12. In some of these examples, the energy sources are connected in parallel and concurrently activated to power the wireless transducing circuit 14 in all of the segments 13 at the same time. In other examples, the energy sources are connected in parallel and alternately activated to power the wireless transducing circuit 14 in respective ones of the adhesive tape platform segments 13 at different time periods, which may or may not overlap.

Figure 2:
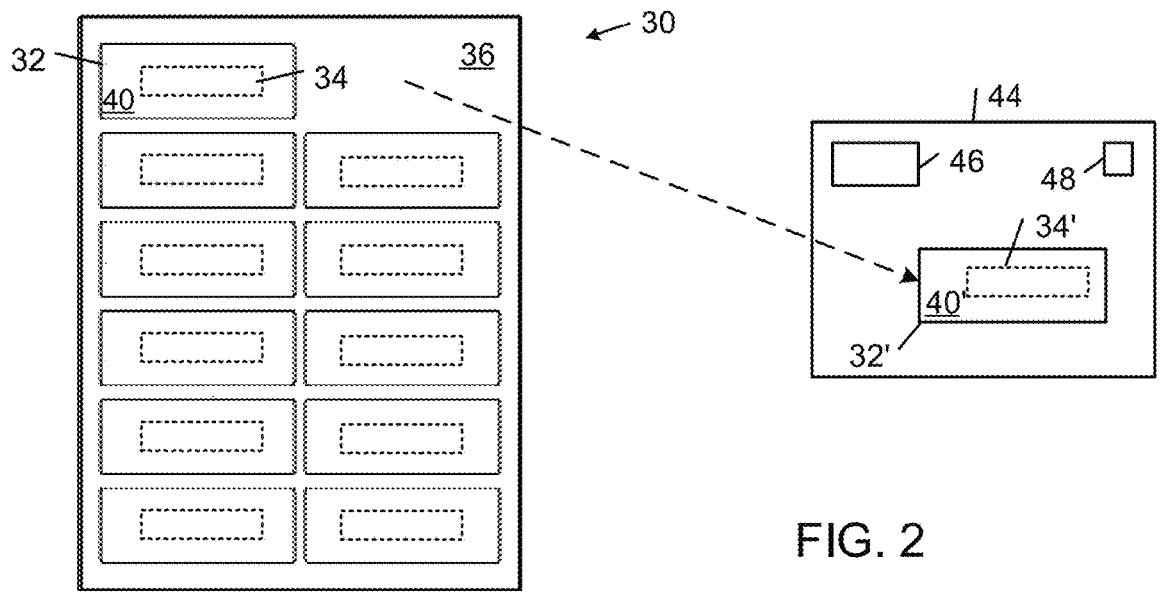
FIG. 2 is a diagrammatic view of an example of an envelope carrying a segment of an example adhesive tape platform dispensed from a backing sheet, in embodiments.

FIG. 2 shows an example adhesive tape platform 30 that includes a set of adhesive tape platform segments 32 each of which includes an embedded wireless transducing circuit 34, and a backing sheet 36 with a release coating that prevents the adhesive tape platform segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40 'of the segment 32' may include any type of writing, markings, decorative designs, or other ornamentation. In the illustrated example, the non-adhesive side 40 'of the segment 32' includes writing or other markings that correspond to a destination address for the envelope 44. The envelope 44 also includes a return address 46 and, optionally, a postage stamp or mark 48.

In some examples, the components of wireless transducing circuit 34 that are embedded in a segment 32 of the adhesive tape platform 30 are activated when the segment 32 is removed from the backing sheet 36. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to components of wireless transducing circuit 34 in the segment 32 in response to the detection of a change in capacitance between the segment 32 and the backing sheet 36 as a result of removing the segment 32 from the backing sheet 36.

Discussions of segments may refer to segments of any of the adhesive tape platforms disclosed herein.

In some examples, segments of the adhesive tape platforms 12 or 30 are deployed by a human operator. The human operator may be equipped with a mobile phone or other device that allows the operator to authenticate and initialize the adhesive tape platform 12. In addition, the operator can take a picture of an asset including the adhesive tape platform 12 and any barcodes associated with the asset and, thereby, create a persistent record that links the adhesive tape platform 12 to the asset. In addition, the human operator typically will send the picture to a network service and/or transmit the picture to the adhesive tape platform 12 for storage in a memory component of the adhesive tape platform 12.

Figure 3:
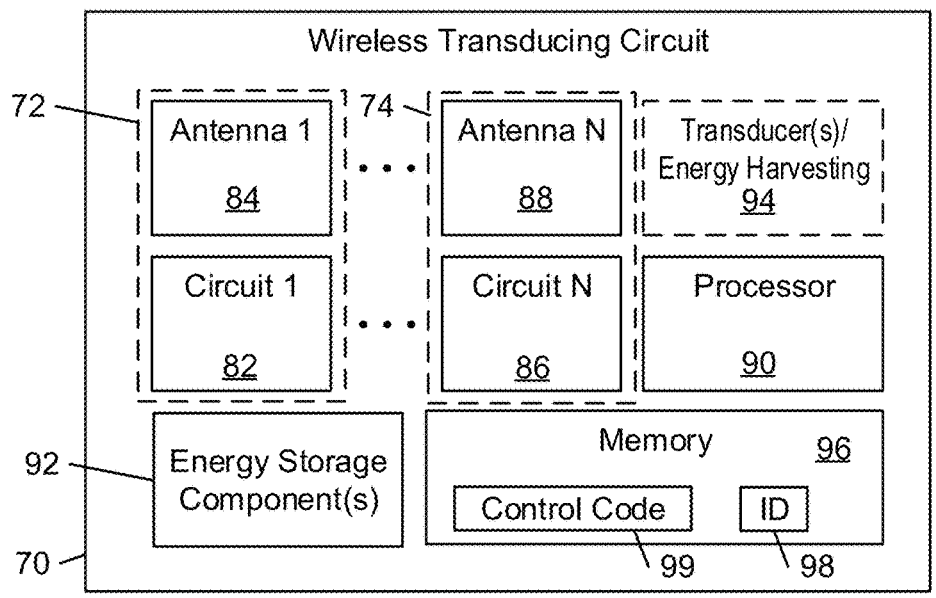
FIG. 3 is a schematic view of a wireless transducing circuit of an example segment shown in FIG. 1B or 2, in embodiments.

FIG. 3 shows a block diagram of the components of an example wireless transducing circuit 70 that includes a number of communication systems 72, 74. Wireless transducing circuit 70 is an example of wireless transducing circuits 14 and 34. Communication systems 72, 74 may include a variety of antennas 1-N with an associated processing circuit a-N. For example, communication system 72 may be a GPS system with a GPS receiver as circuit 82 (e.g., a receiver integrated circuit) and a GPS antenna as antenna 84. Communication system 74 may also include a respective transceiver (e.g., a transceiver integrated circuit) as circuit 86 and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage components 92 (e.g., non-rechargeable or rechargeable printed flexible battery, conventional single or multiple cell battery, and/or a super capacitor or charge pump), one or more transducers 94 (e.g., sensors and/or actuators, and, optionally, one or more energy harvesting transducer components). In some examples, the conventional single or multiple cell battery may be a watch style disk or button cell battery and associated electrical connection apparatus (e.g., a metal clip) that electrically connects the electrodes of the battery to contact pads on a flexible circuit 116, discussed below in connection with FIGS. 5A-5C.

Examples of sensing transducers 94 include a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data, including, e.g., profile data, state data, event data, sensor data, localization data, security data, and one or more unique identifiers (ID) 98 associated with the wireless transducing circuit 70, such as a product ID, a type ID, and a media access control (MAC) ID, and control code 99. In some examples, the memory 96 may be incorporated into one or more of the processor 90 or transducers 94, or may be a separate component that is integrated in the wireless transducing circuit 70 as shown in FIG. 3. The control code typically is implemented as programmatic functions or program modules that control the operation of the wireless transducing circuit 70, including a tape node communication manager that manages the manner and timing of tape node communications, a tape node power manager that manages power consumption, and a tape node connection manager that controls whether connections with other tape nodes are secure connections or unsecure connections, and a tape node storage manager that securely manages the local data storage on the node. The tape node connection manager ensures the level of security required by the end application and supports various encryption mechanisms. The tape node power manager and tape communication manager work together to optimize the battery consumption for data communication. In some examples, execution of the control code by the different types of tape nodes described herein may result in the performance of similar or different functions.

Figure 4:
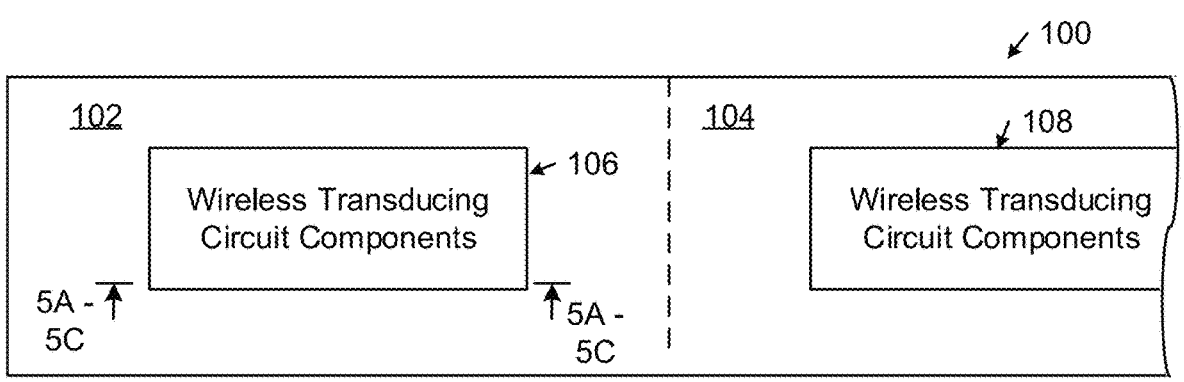
FIG. 4 is a diagrammatic top view of a length of an example adhesive tape platform, in embodiments.

FIG. 4 is atop view of a portion of an example flexible adhesive tape platform 100 that shows a first segment 102 and a portion of a second segment 104. Adhesive tape platform 100 may be an example of adhesive tape platform 12. Each segment 102, 104 of the flexible adhesive tape platform 100 includes a respective set of components 106, 108 of the components of the wireless transducing circuit 70. The segments 102, 104 and their respective sets of components 106, 108 typically are identical and configured in the same way. In some embodiments, however, the segments 102, 104 and/or their respective sets of components 106, 108 are different and/or configured in different ways. For example, different groups of segments of the flexible adhesive tape platform 100 have different sets or configurations of tracking and/or transducing components that are designed and/or optimized for different applications, or different groups of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. Pat. No. 10,262,255 issued Apr. 16, 2019, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities. Embodiments disclosed herein may encompass adhesive tape platform 12 or 30, for example. Further, embodiments disclosed herein may encompass either segment 102 or 104 or any segment on flexible adhesive tape platform 100.

Figure 5A:
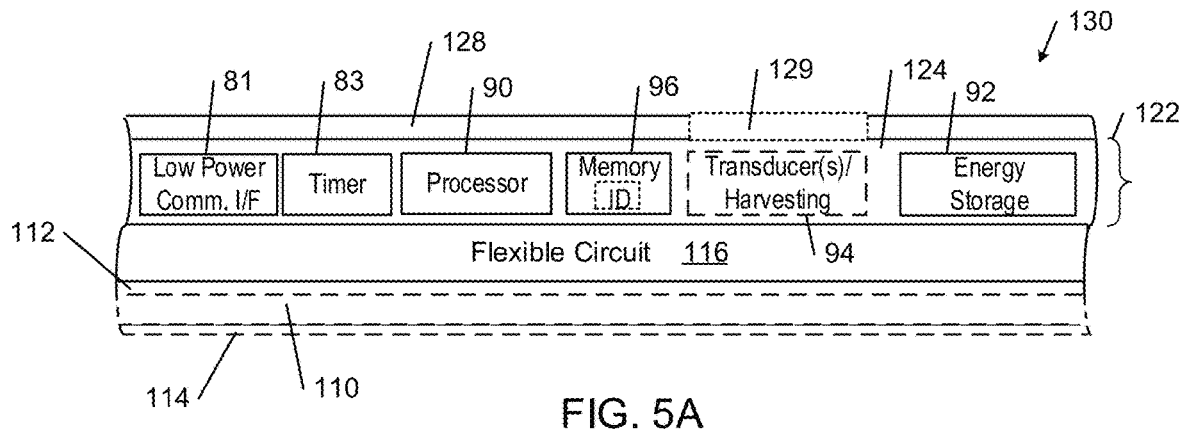
FIGS. 5A-5C show diagrammatic cross-sectional side views of segments of different respective adhesive tape platforms, in embodiments.
Figure 5B:
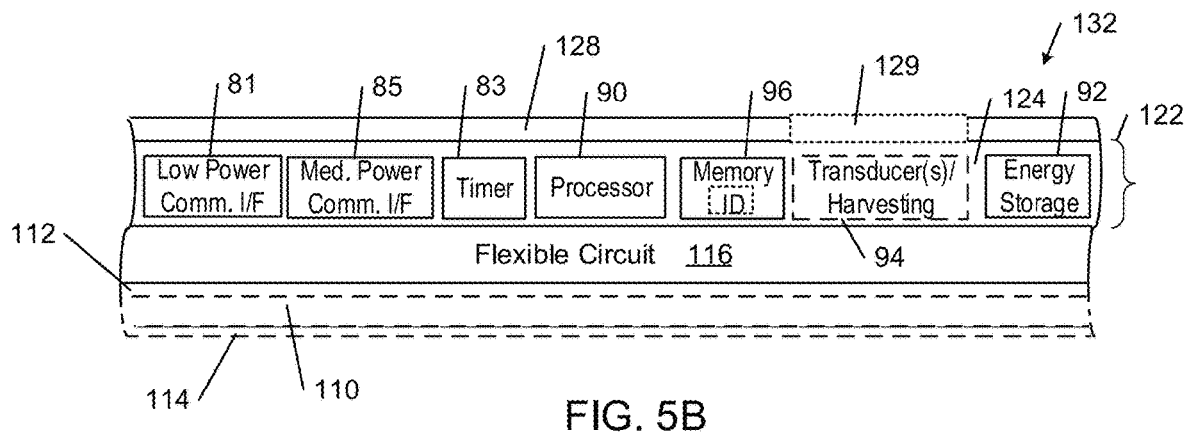
Figure 5C:
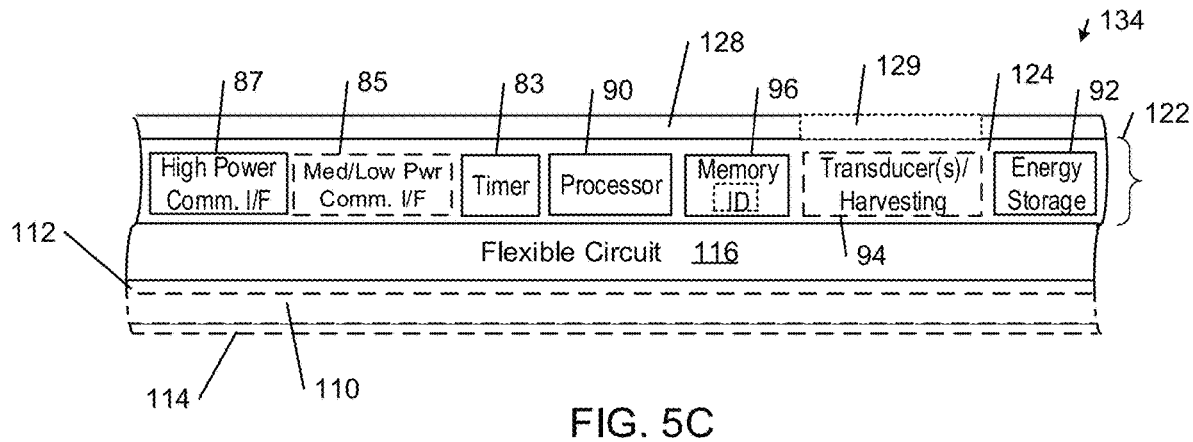

FIGS. 5A-5C illustrate cross-sectional side views of a portion of any of the segments disclosed herein as tape nodes 130, 132 and 134. In embodiments, the terms "segment" and "tape node" may be used interchangeably.

FIG. 5A shows a cross-sectional side view of a portion of an example segment 102 of the flexible adhesive tape platform 100 as tape node 130 that includes a respective set of the components 106 corresponding to a first tape node type. Tape node 130 includes an adhesive layer 112, an optional flexible substrate 110, and an optional adhesive layer 114 on the bottom surface of the flexible substrate 110. If the adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the segment 102 from a surface on which the adhesive layer 114 is adhered without destroying the physical or mechanical integrity of the tape node 130 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power communication interface 81 (e.g., a Zigbee, Bluetooth® Low Energy (BLE) interface, or other low power communication interface), a timer circuit 83, transducers 94 and/or energy harvesting component(s) (if present), the memory 96, and other components in a device layer 122 to each other and to the energy storage component 92 and, thereby, enable the transducing, tracking and other functionalities of tape node 130. The low power communication interface 81 typically includes one or more of the antennas 84, 88 and one or more of the circuits 82, 86.

FIG. 5B shows a cross-sectional side view of a portion of an example tape node 132 that includes a respective set of the components 106 corresponding to a second tape node type. In this example, tape node 132 differs from tape node 130 shown in FIG. 5A by the inclusion of a medium power communication interface 85 (e.g., a LoRa interface) in addition to the low power communications interface 81 that is present in the first tape node type (i.e., white). The medium power communication interface 85 has longer communication range than the low power communication interface 81. In some examples, one or more other components of tape node 132 differ, for example, in functionality or capacity (e.g., larger energy source).

FIG. 5C shows a cross-sectional side view of a portion of an example tape node 134 that includes a respective set of the components 106 corresponding to a third tape node type. In this example, tape node 134 includes a high power communications interface 87 (e.g., a cellular interface; e.g., GSM/GPRS) and an optional medium power communications interface 85. As shown, low power communications interface 81 and medium power communications interface 85 may be combined in one device in segment 105. The high power communication range provides global coverage to available infrastructure (e.g. the cellular network). In some examples, one or more other components of tape node 134 differ, for example, in functionality or capacity (e.g., larger energy source).

FIGS. 5A-5C show examples in which the flexible cover 128 of the flexible adhesive tape platform 100 includes one or more interfacial regions 129 positioned over one or more of the transducers 94. In examples, one or more of the interfacial regions 129 have features, properties, compositions, dimensions, and/or characteristics that are designed to improve the operating performance of the adhesive tape platform 100 for specific applications. In some examples, the flexible adhesive tape platform 100 includes multiple interfacial regions 129 over respective transducers 94, which may be the same or different depending on the target applications. Example interfacial regions include an opening, an optically transparent window, and/or a membrane located in the interfacial region 129 of the flexible cover 128 that is positioned over the one or more transducers 94 and/or energy harvesting components (if present). Additional details regarding the structure and operation of example interfacial regions 129 are described in U.S. Provisional Patent Application No. 62/680,716, filed Jun. 5, 2018, and U.S. Provisional Patent Application No. 62/670,712, filed May 11, 2018.

In some examples, a flexible polymer layer 124 encapsulates the device layer 122 and thereby reduces the risk of damage that may result from the intrusion of contaminants and/or liquids (e.g., water) into the device layer 122. The flexible polymer layer 124 also planarizes the device layer 122. This facilitates optional stacking of additional layers on the device layer 122 and also distributes forces generated in, on, or across tape nodes 130, 132 or 134 so as to reduce potentially damaging asymmetric stresses that might be caused by the application of bending, torqueing, pressing, or other forces that may be applied to tape nodes 130, 132 or 134 during use. In the illustrated example, a flexible cover 128 is bonded to the planarizing flexible polymer layer 124 by an adhesive layer (not shown).

The flexible cover 128 and the flexible substrate 110 may have the same or different compositions depending on the intended application. In some examples, one or both of the flexible cover 128 and the flexible substrate 110 include flexible film layers and/or paper substrates, where the film layers may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, the adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 128 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 124 is composed of a flexible epoxy (e.g., silicone).

In some examples, the energy storage component 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the embodiments of tape nodes 130, 132 or 134 shown in FIGS. 5A-5C, the flexible circuit 116 is a single access flex circuit that interconnects the components of the adhesive tape platform on a single side of the flexible circuit 116. In other embodiments, the flexible circuit 116 is a double access flex circuit that includes a front-side conductive pattern that interconnects the low power communication interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the circuits 82, 86 (e.g., receivers, transmitters, and transceivers) to their respective antennas 84, 88 and to the processor 90, and also connects the processor 90 to the one or more transducers 94 and the memory 96. The backside conductive pattern connects the active electronics (e.g., the processor 90, the circuits 82, 86, and the transducers) on the front-side of the flexible circuit 116 to the electrodes of the flexible battery via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some embodiments, a set of multiple flexible adhesive tape platforms 100 are provided that include different respective sampling densities in order to seal different asset sizes with a desired number of wireless transducing circuits 70. In particular, the number of wireless transducing circuits per asset size is given by the product of the sampling density specified for the adhesive tape platform and the respective size of the adhesive tape platform 100 needed to seal the asset. This allows an automated packaging system to select the appropriate type of flexible adhesive tape platform 100 to use for sealing a given asset with the desired redundancy (if any) in the number of wireless transducer circuits 70. In some example applications (e.g., shipping low value goods), only one wireless transducing circuit 70 is used per asset, whereas in other applications (e.g., shipping high value goods) multiple wireless transducing circuits 70 are used per asset. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Figure 6:
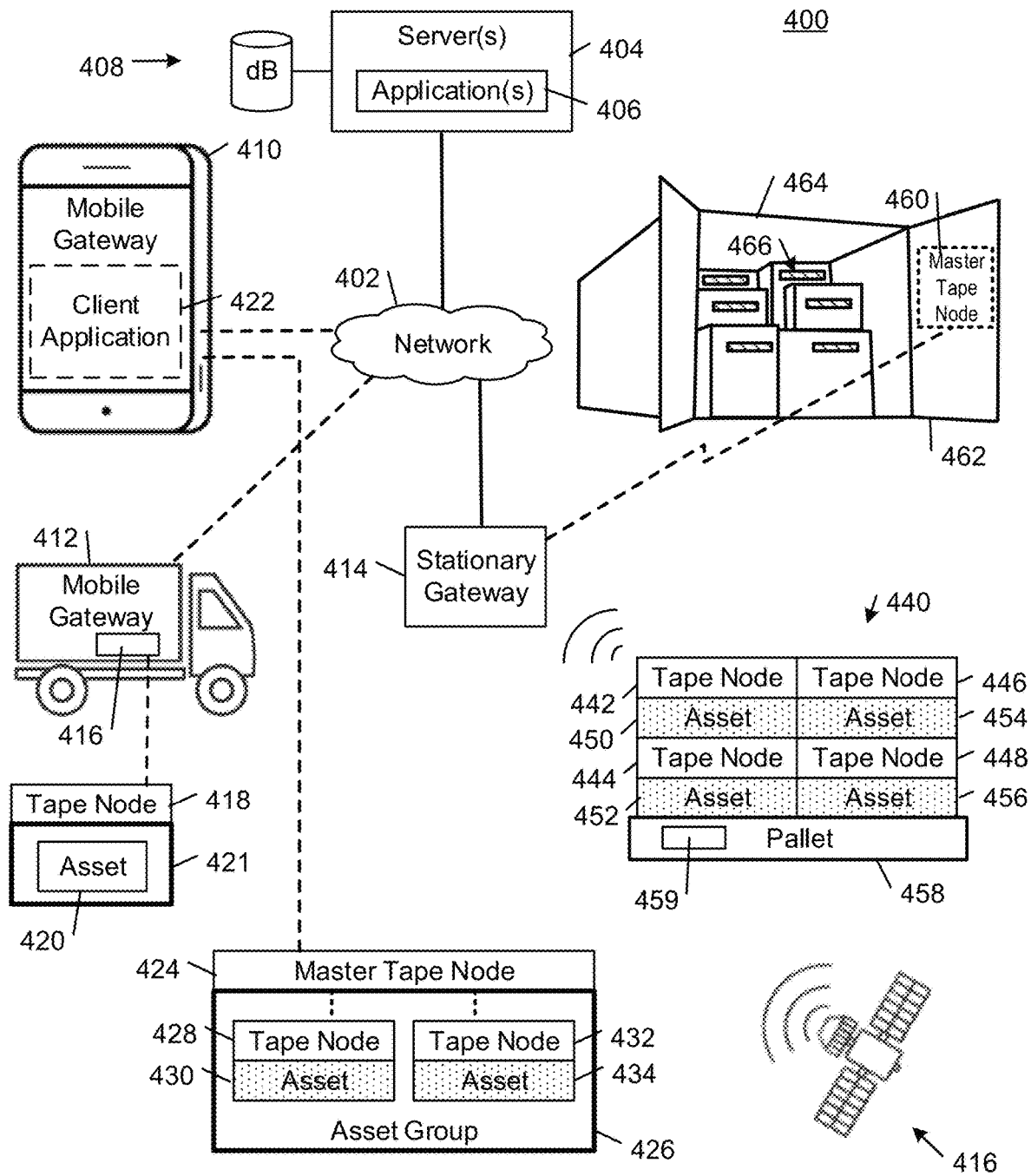
FIG. 6 is a diagrammatic view of an example of a network environment supporting communications with segments of an adhesive tape platform, in embodiments.

FIG. 6 shows an example wireless communications environment 400 that includes a network 402 supporting communications between one or more servers 404 executing one or more applications of a network service 408, mobile gateways 410, 412, a stationary gateway 414, and various types of tape nodes that are associated with various assets (e.g., parcels, equipment, tools, persons, and other things). The example wireless communication environment 400 may also be referred to as a wireless sensing system. The nodes of the wireless sensing system may refer to the tape nodes, other wireless devices, the gateway devices, client devices, servers, and other components of the wireless sensing system. In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as a geolocation satellite system (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems. connections between equipment in environment 400 and network 402 may be wired or wireless.

In some examples, the one or more network service applications 406 operating in server 404 may leverage the above-mentioned communications technologies to create a hierarchical wireless network of tape nodes that improves asset management operations by reducing costs and improving efficiency in a wide range of processes, from asset packaging, asset transporting, asset tracking, asset condition monitoring, asset inventorying, and asset security verification. Communication across the network is protected by a variety of different security mechanisms. In the case of existing infrastructure, a communication link uses the infrastructure security mechanisms. In case of communications among tape nodes, the communication is secured through a custom security mechanism. In certain cases, tape nodes can also be configured to support blockchain processes to protect the transmitted and stored data.

A set of tape nodes can be configured by the network service 408 to create a hierarchical communications network. The hierarchy can be defined in terms of one or more factors, including functionality (e.g., wireless transmission range or power), role (e.g., master tape node vs. peripheral tape node), or cost (e.g., a tape node equipped with a cellular transceiver vs. a peripheral tape node equipped with a Bluetooth LE transceiver). Tape nodes can be assigned to different levels of a hierarchical network according to one or more of the above-mentioned factors. For example, the hierarchy can be defined in terms of communication range or power, where tape nodes with higher power or longer communication range transceivers are arranged at a higher level of the hierarchy than tape nodes with lower power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure can be formulated as an optimization problem with battery capacity of nodes, power consumption in various modes of operation, desired latency, external environment, etc. and can be solved using modern optimization methods e.g. neural networks, artificial intelligence, and other machine learning computing systems that take expected and historical data to create an optimal solution and can create algorithms for modifying the system's behavior adaptively in the field.

The tape nodes may be deployed by automated equipment or manually. In this process, a tape node typically is separated from a roll or sheet and adhered to an asset, or other stationary or mobile object (e.g., a structural element of a warehouse, or a vehicle, such as a delivery truck) or stationary object (e.g., a structural element of a building). This process activates the tape node and causes the tape node to communicate with a server 404 of the network service 408. In this process, the tape node may communicate through one or more other tape nodes in the communication hierarchy. In this process, server 404 executes the network service application 406 to programmatically configure tape nodes that are deployed in the environment 400. In some examples, there are multiple classes or types of tape nodes, where each tape node class has a different respective set of functionalities and/or capacities.

In some examples, the one or more servers 404 of network service 408 communicate over the network 402 with one or more gateways that are configured to send, transmit, forward, or relay messages to the network 402 and activated tape nodes that are associated with respective assets and within communication range. Example gateways include mobile gateways 410, 412 and a stationary gateway 414. In some examples, the mobile gateways 410, 412, and the stationary gateway 414 are able to communicate with the network 402 and with designated sets or groups of tape nodes.

In some examples, the mobile gateway 412 is a vehicle (e.g., a delivery truck or other mobile hub) that includes a wireless communications unit 416 that is configured by the network service 408 to communicate with a designated set of tape nodes, including a peripheral tape node 418 in the form of a label that is adhered to an asset 420 contained within a parcel 421 (e.g., an envelope), and is further configured to communicate with the network service 408 over the network 402. In some examples, the peripheral tape node 418 includes a lower power wireless communications interface of the type used in, e.g., tape node 130 (shown in FIG. 5A), and the wireless communications unit 416 is implemented by a tape node (e.g., one of tape node 132 or tape node 134, respectively shown in FIGS. 5B and 5C) that includes a lower power communications interface for communicating with tape nodes within range of the mobile gateway 412 and a higher power communications interface for communicating with the network 402. In this way, the peripheral tape nodes 418 and wireless communications unit 416 create a hierarchical wireless network of nodes for transmitting, forwarding, bridging, relaying, or otherwise communicating wireless messages to, between, or on behalf of the peripheral tape node 418 and the network service 408 in a power-efficient and cost-effective way.

In some examples, the mobile gateway 410 is a mobile phone that is operated by a human operator and executes a client application 422 that is configured by the network service 408 to communicate with a designated set of tape nodes, including a master tape node 424 that is adhered to a parcel 426 (e.g., a box), and is further configured to communicate with the network service 408 over the network 402. In the illustrated example, the parcel 426 contains a first parcel labeled or sealed by a tape node 428 and containing a first asset 430, and a second parcel labeled or sealed by a tape node 432 and containing a second asset 434. As explained in detail below, the master tape node 424 communicates with each of the peripheral tape nodes 428, 432 and communicates with the network service 408 in accordance with a hierarchical wireless network of tape nodes. In some examples, each of the peripheral tape nodes 428, 432 includes a lower power wireless communications interface of the type used in, e.g., tape node 130 (shown in FIG. 5A), and the master tape node 424 is implemented by a tape node (e.g., tape node 132, shown in FIG. 5B) that includes a lower power communications interface for communicating with the peripheral tape nodes 428, 432 contained within the parcel 426, and a higher power communications interface for communicating with the mobile gateway 410. The master tape node 424 is operable to relay wireless communications between the tape nodes 428, 432 contained within the parcel 426 and the mobile gateway 410, and the mobile gateway 410 is operable to relay wireless communications between the master tape node 424 and the network service 408 over the network 402. In this way, the master tape node 424 and the peripheral tape nodes 428 and 432 create a hierarchical wireless network of nodes for transmitting, forwarding, relaying, or otherwise communicating wireless messages to, between, or on behalf of the peripheral tape nodes 428, 432 and the network service 408 in a power-efficient and cost-effective way.

In some examples, the stationary gateway 414 is implemented by a server executing a server application that is configured by the network service 408 to communicate with a designated set 440 of tape nodes 442, 444, 446, 448 that are adhered to respective parcels containing respective assets 450, 452, 454, 456 on a pallet 458. In other examples, the stationary gateway 414 is implemented by a tape node (e.g., one of tape node 132 or tape node 134, respectively shown in FIGS. 5B and 5C) that is adhered to, for example, a wall, column or other infrastructure component of the environment 400, and includes a lower power communications interface for communicating with tape nodes within range of the stationary gateway 414 and a higher power communications interface for communicating with the network 402. In one embodiment, each of the tape nodes 442-448 is a peripheral tape node and is configured by the network service 408 to communicate individually with the stationary gateway 414, which relays communications from the tape nodes 442-448 to the network service 408 through the stationary gateway 414 and over the network 402. In another embodiment, one of the tape nodes 442-448 at a time is configured as a master tape node that transmits, forwards, relays, or otherwise communicate wireless messages to, between, or on behalf of the other tape nodes on the pallet 458. In this embodiment, the master tape node may be determined by the tape nodes 442-448 or designated by the network service 408. In some examples, the tape node with the longest range or highest remaining power level is determined to be the master tape node. In some examples, when the power level of the current master tape node drops below a certain level (e.g., a fixed power threshold level or a threshold level relative to the power levels of one or more of the other tape nodes), another one of the tape nodes assumes the role of the master tape node. In some examples, a master tape node 459 is adhered to the pallet 458 and is configured to perform the role of a master node for the tape nodes 442-448. In these ways, the tape nodes 442-448, 459 are configurable to create different hierarchical wireless networks of nodes for transmitting, forwarding, relaying, bridging, or otherwise communicating wireless messages with the network service 408 through the stationary gateway 414 and over the network 402 in a power-efficient and cost-effective way.

In the illustrated example, the stationary gateway 414 also is configured by the network service 408 to communicate with a designated set of tape nodes, including a master tape node 460 that is adhered to the inside of a door 462 of a shipping container 464, and is further configured to communicate with the network service 408 over the network 402. In the illustrated example, the shipping container 464 contains a number of parcels labeled or sealed by respective peripheral tape nodes 466 and containing respective assets. The master tape node 460 communicates with each of the peripheral tape nodes 466 and communicates with the stationary gateway 414 in accordance with a hierarchical wireless network of tape nodes. In some examples, each of the peripheral tape nodes 466 includes a lower power wireless communications interface of the type used in, e.g., tape node 130 (shown in FIG. 5A), and the master tape node 460 is implemented by a tape node (e.g., tape node 132, shown in FIG. 5B) that includes a lower power communications interface for communicating with the peripheral tape nodes 466 contained within the shipping container 464, and a higher power communications interface for communicating with the stationary gateway 414.

In some examples, when the doors of the shipping container 464 are closed, the master tape node 460 is operable to communicate wirelessly with the peripheral tape nodes 466 contained within the shipping container 464. In an example, the master tape node 460 is configured to collect sensor data from the peripheral tape nodes and, in some embodiments, process the collected data to generate, for example, one or more histograms from the collected data. When the doors of the shipping container 464 are open, the master tape node 460 is programmed to detect the door opening (e.g., with an accelerometer component of the master tape node 460) and, in addition to reporting the door opening event to the network service 408, the master tape node 460 is further programmed to transmit the collected data and/or the processed data in one or more wireless messages to the stationary gateway 414. The stationary gateway 414, in turn, is operable to transmit the wireless messages received from the master tape node 460 to the network service 408 over the network 402. Alternatively, in some examples, the stationary gateway 414 also is operable to perform operations on the data received from the master tape node 460 with the same type of data produced by the master tape node 459 based on sensor data collected from the tape nodes 442-448. In this way, the master tape node 460 and the peripheral tape nodes 466 create a hierarchical wireless network of nodes for transmitting, forwarding, relaying, or otherwise communicating wireless messages to, between, or on behalf of the peripheral tape nodes 466 and the network service 408 in a power-efficient and cost-effective way.

In an example of the embodiment shown in FIG. 6, there are three classes of tape nodes: a short range tape node, a medium range tape node, and a long range tape node, as respectively shown in FIGS. 5A-5C. The short range tape nodes typically are adhered directly to parcels containing assets. In the illustrated example, the tape nodes 418, 428, 432, 442-448, 466 are short range tape nodes. The short range tape nodes typically communicate with a low power wireless communication protocol (e.g., Bluetooth LE, Zigbee, or Z-wave). The medium range tape nodes typically are adhered to objects (e.g., parcel 426, pallet 458 or shipping container 464) that are associated with multiple parcels or assets that are separated from the medium range tape nodes by a barrier or a large distance. In the illustrated example, the tape nodes 424, 459 and 460 are medium range tape nodes. The medium range tape nodes typically communicate with a medium power wireless communication protocol (e.g., LoRa or Wi-Fi). The long-range tape nodes typically are adhered to mobile or stationary infrastructure of the wireless communication environment 400. In the illustrated example, the mobile gateway 412 and the stationary gateway 414 are long range tape nodes. The long range tape nodes typically communicate with other nodes using a high power wireless communication protocol (e.g., a cellular data communication protocol). In some examples, wireless communications unit 416 is adhered to a mobile vehicle (e.g., a truck). In these examples, the mobile gateway 412 may be moved to different locations in the environment 400 to assist in connecting other tape nodes to the server 404. In some examples, the stationary gateway 414 may be attached to a stationary structure (e.g., a wall) in the environment 400 with a known geographic location. In these examples, other tape nodes in the environment can determine their geographic location by querying the stationary gateway 414.

Figure 7:
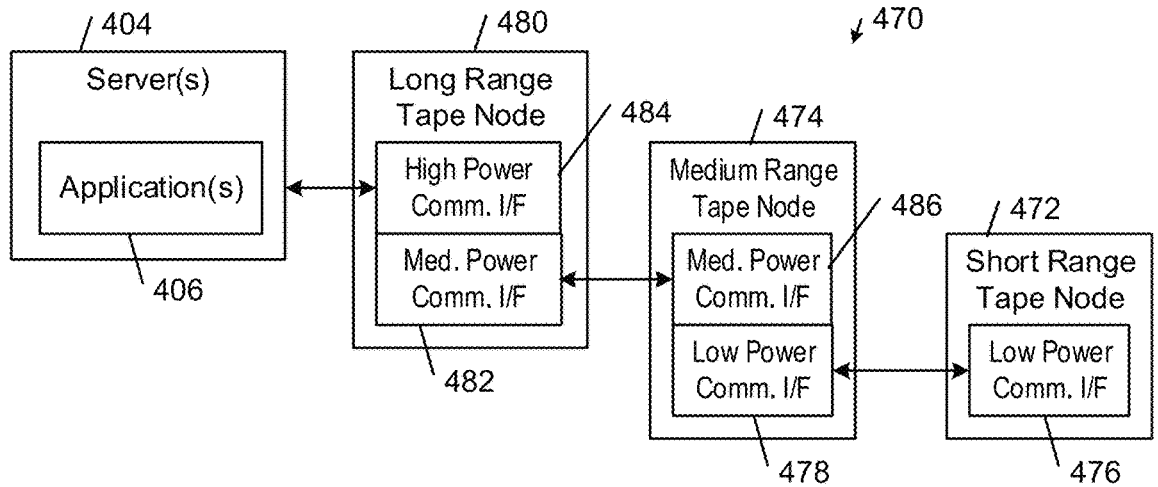
FIG. 7 is a diagrammatic view of a hierarchical communications network, in embodiments.

FIG. 7 shows an example hierarchical wireless communications network 470 of tape nodes. Short range tape node 472 is an example of tape node 130, medium range tape node 474 is an example of tape node 132 and long range tape node 480 is an example of tape node 134. In this example, the short range tape node 472 and the medium range tape node 474 communicate with one another over their respective low power wireless communication interfaces 476, 478. The medium range tape node 474 and the long range tape node 480 communicate with one another over their respective medium power communication interfaces 486, 482. The long range tape node 480 and server 404 communicate with one another over the high power communication interface 484. In some examples, the low power communication interfaces 476, 478 establish wireless communications with one another in accordance with the Bluetooth LE protocol, the medium power communication interfaces 486, 482 establish wireless communications with one another in accordance with the LoRa communications protocol, and the high power communication interface 484 establishes wireless communications with the server 404 in accordance with a cellular communications protocol.

In some examples, the different types of tape nodes are deployed at different levels in the communications hierarchy according to their respective communications ranges, with the long range tape nodes generally at the top of the hierarchy, the medium range tape nodes generally in the middle of the hierarchy, and the short range tape nodes generally at the bottom of the hierarchy. In some examples, the different types of tape nodes are implemented with different feature sets that are associated with component costs and operational costs that vary according to their respective levels in the hierarchy. This allows system administrators the flexibility to optimize the deployment of the tape nodes to achieve various objectives, including cost minimization, asset tracking, asset localization, and power conservation.

In some examples, a server 404 of the network service 408 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the server 404 of the network service 408. The schedule usually dictates all aspects of the communication, including the times when particular tape nodes should communicate, the mode of communication, and the contents of the communication. In one example, the server 404 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 404, either directly or indirectly through a gateway tape node (e.g., wireless communications unit 416 implemented as a long range tape node adhered to the mobile gateway 412 affixed to a vehicle or the stationary gateway 414 implemented as a long range tape node adhered to an infrastructure component of the environment 400). In other examples, the master tape node processes the information contained in the received data packets and transmits the processed information to the network service 408.

Figure 8:
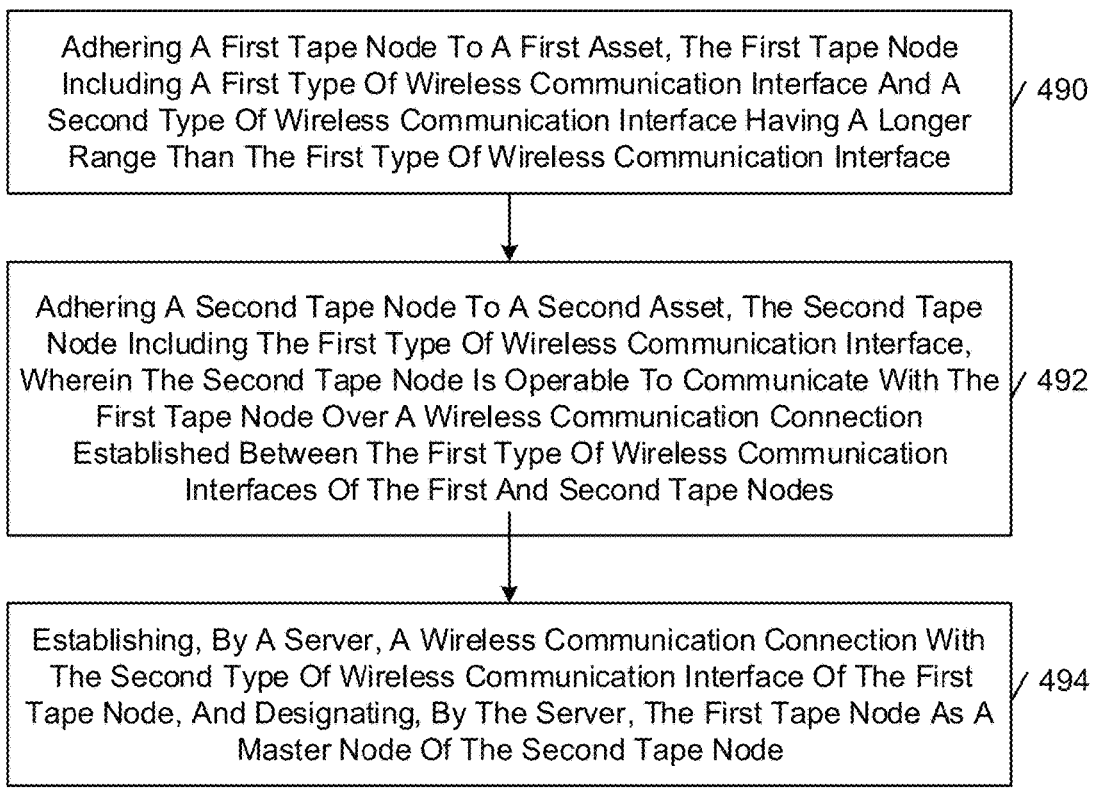
FIG. 8 is a flow diagram of a method of creating a hierarchical communications network, in embodiments.

FIG. 8 shows an example method of creating a hierarchical communications network. In accordance with this method, a first tape node is adhered to a first asset in a set of associated assets, the first tape node including a first type of wireless communication interface and a second type of wireless communication interface having a longer range than the first type of wireless communication interface (FIG. 8, block 490). A second tape node is adhered to a second asset in the set, the second tape node including the first type of wireless communication interface, wherein the second tape node is operable to communicate with the first tape node over a wireless communication connection established between the first type of wireless communication interfaces of the first and second tape nodes (FIG. 8, block 492). An application executing on a computer system (e.g., a server 404 of a network service 408) establishes a wireless communication connection with the second type of wireless communication interface of the first tape node, and the application transmits programmatic code executable by the first tape node to function as a master tape node with respect to the second tape node (FIG. 8, block 494).

In some embodiments, the second tape node is assigned the role of the master tape node with respect to the first tape node.

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

The following disclosure describes a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node's mission (or objective) is defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services define the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent/node knows its objectives (programmed). Every agent knows which capabilities/resources it needs to fulfill objective. Every agent communicates with every other node in proximity to see if it can offer the capability. Examples include communicate data to the server, authorize going to lower power level, temperature reading, send an alert to local hub, send location data, triangulate location, any boxes in same group that already completed group objectives.

Nodes can be associated with items. Examples of an item includes, but are not limited to for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the items.

Communication paths between tape and/or non-tape nodes may be represented by a graph of edges between the corresponding assets (e.g., a storage unit, truck, or hub). In some embodiments, each node in the graph has a unique identifier. A set of connected edges between nodes is represented by a sequence of the node identifiers that defines a communication path between a set of nodes.

Figure 9A:
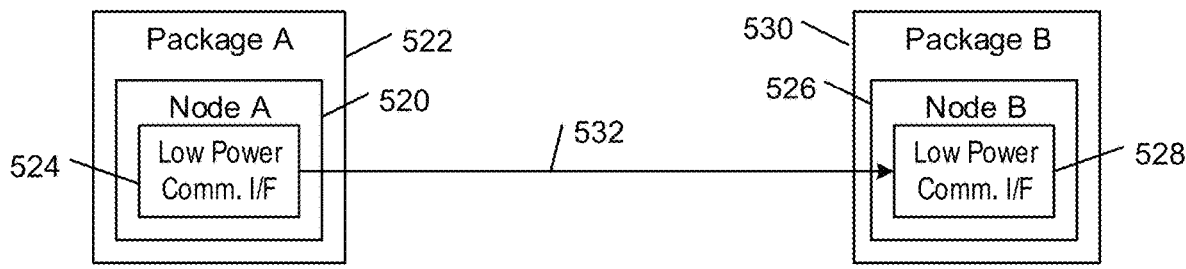
FIGS. 9A-9E are diagrammatic views of exemplary use cases for a distributed agent operating system, in embodiments.

Referring to FIG. 9A, a node 520 (Node A) is associated with a package 522 (Package A). In some embodiments, the node 520 may be implemented as a tape node that is used to seal the package 522 or it may be implemented as a label node that is used to label the package 522; alternatively, the node 520 may be implemented as a non-tape node that is inserted within the package 522 or embedded in or otherwise attached to the interior or exterior of the package 522. In the illustrated embodiment, the node 520 includes a low power communications interface 524 (e.g., a Bluetooth Low Energy communications interface). Another node 526 (Node B), which is associated with another package 530 (Package B), is similarly equipped with a compatible low power communications interface 528 (e.g., a Bluetooth Low Energy communications interface). Tape nodes 520 and 526 may be examples of tape node 130 or 132 of FIGS. 5A-5B.

In an example scenario, in accordance with the programmatic code stored in its memory, node 526 (Node B) requires a connection to node 520 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 520 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 532 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 9B:
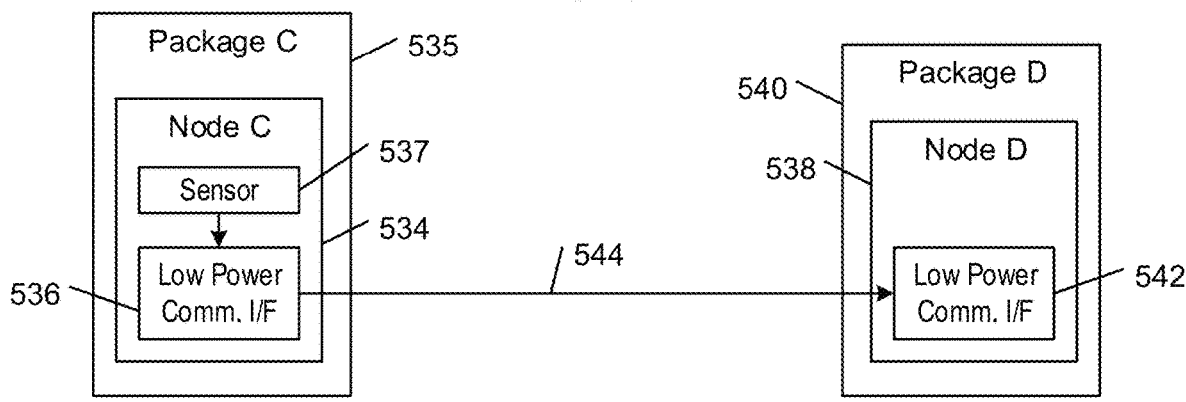

Referring to FIG. 9B, a node 534 (Node C) is associated with a package 535 (Package C). In the illustrated embodiment, the Node C includes a low power communications interface 536 (e.g., a Bluetooth Low Energy communications interface), and a sensor 537 (e.g., a temperature sensor). Another node 538 (Node D), which is associated with another package 540 (Package D), is similarly equipped with a compatible low power communications interface 542 (e.g., a Bluetooth Low Energy communications interface). Tape nodes 534 and 538 may be examples of tape node 130 or 132 of FIGS. 5A-5B.

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 544 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 9C:
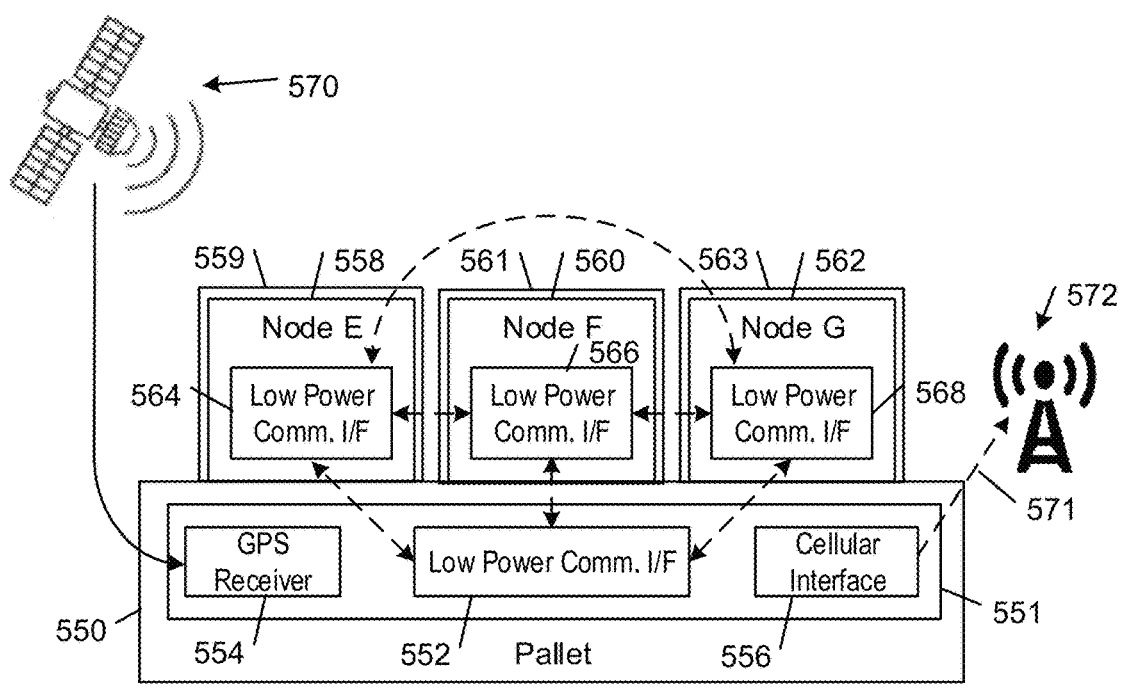

Referring to FIG. 9C, a pallet 550 is associated with a master node 551 that includes a low power communications interface 552, a GPS receiver 554, and a cellular communications interface 556. In some embodiments, the master node 551 may be implemented as a tape node or a label node that is adhered to the pallet 550. In other embodiments, the master node 551 may be implemented as a non-tape node that is inserted within the body of the pallet 550 or embedded in or otherwise attached to the interior or exterior of the pallet 550. Master node 551 may be an example of tape node 134 of FIG. 5C.

The pallet 550 provides a structure for grouping and containing packages 559, 561, 563 each of which is associated with a respective peripheral node 558, 560, 562 (Node E, Node F, and Node G). Each of the peripheral nodes 558, 560, 562 includes a respective low power communications interface 564, 566, 568 (e.g., Bluetooth Low Energy communications interface). In the illustrated embodiment, each of the nodes E, F, G and the master node 551 are connected to each of the other nodes over a respective low power communications path (shown by dashed lines). Tape nodes 558, 560 and 562 may be examples of tape node 130 or 132 of FIGS. 5A-5B.

In some embodiments, the packages 559, 561, 563 are grouped together because they are related. For example, the packages 559, 561, 563 may share the same shipping itinerary or a portion thereof. In an example scenario, the master node 551 scans for advertising packets that are broadcasted from the peripheral nodes 558, 560, 562. In some examples, the peripheral nodes broadcast advertising packets during respective scheduled broadcast intervals. The master node 551 can determine the presence of the packages 559, 561, 563 in the vicinity of the pallet 550 based on receipt of one or more advertising packets from each of the nodes E, F, and G. In some embodiments, in response to receipt of advertising packets broadcasted by the peripheral nodes 558, 560, 562, the master node 551 transmits respective requests to server 404 over cellular communication path 571 on a cellular network 572 to associate the master node 551 and the respective peripheral nodes 558, 560, 562. In some examples, the master tape node requests authorization from server 404 to associate the master tape node and the peripheral tape nodes. If the corresponding packages 559, 561, 563 are intended to be grouped together (e.g., they share the same itinerary or certain segments of the same itinerary), the server authorizes the master node 551 to associate the peripheral nodes 558, 560, 562 with one another as a grouped set of packages. In some embodiments, server 404 registers identifiers from master node 551 and peripheral nodes 558, 560, 562 with a group identifier. The server also may associate each node ID with a respective physical label ID that is affixed to the respective package.

In some embodiments, after an initial set of packages is assigned to a multi-package group, the master node 551 may identify another package arriving in the vicinity of the multi-package group. The master node may request authorization from server 404 to associate the other package with the existing multi-package group. If the server determines that the other package is intended to ship with the multi-package group, the server 404 instructs master node 551 to merge one or more other packages with currently grouped set of packages. After all packages are grouped together, server 404 authorizes the multi-package group to ship. In some embodiments, this process may involve releasing the multi-package group from a containment area (e.g., customs holding area) in a shipment facility.

In some embodiments, the peripheral nodes 558, 560, 562 include environmental sensors for obtaining information regarding environmental conditions in the vicinity of the associated packages 559, 561, 563. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 551 can determine its own location based on geolocation data transmitted by a satellite-based radio navigation system 570 (e.g., GPS, GLONASS, and NAVSTAR) and received by the GPS receiver 554 component of the master node 551. In an alternative embodiment, the location of the master node 551 can be determined using cellular based navigation techniques that use mobile communication technologies (e.g., GSM, GPRS, CDMA, etc.) to implement one or more cell-based localization techniques. After the master node 551 has ascertained its location, the distance of each of the packages 559, 561, 563 from the master node 551 can be estimated based on the average signal strength of the advertising packets that the master node 551 receives from the respective peripheral node. The master node 551 can then transmit its own location and the locations of the package nodes E, F, and G to a server over a cellular interface connection with a cellular network 572. Other methods of determining the distance of each of the packages 559, 561, 563 from the master node 551, such as Received Signal-Strength Index (RSSI) based indoor localization techniques, also may be used.

In some embodiments, after determining its own location and the locations of the peripheral nodes, the master node 551 reports the location data and the collected and optionally processed (e.g., either by peripheral nodes 558, 560, 562 or the master node 551) sensor data to a server 404 over a cellular communication path 571 on a cellular network 572.

In some examples, nodes are able to autonomously detect logistics execution errors if packages that are supposed to travel together no longer travel together, and raise an alert. For example, a node (e.g., the master node 551 or one of the peripheral nodes 558, 560, 562) alerts the server when the node determines that a package 559 is being or has already been improperly separated from the group of packages. The node may determine that there has been an improper separation of the package 559 in a variety of ways. For example, the associated peripheral node 558 that is bound to the package 559 may include an accelerometer that generates a signal in response to movement of the package from the pallet. In accordance with its intelligent agent program code, the associated peripheral node 558 determines that the master node 551 has not disassociated the package 559 from the group and therefore broadcasts advertising packets to the master node, which causes the master node 551 to monitor the average signal strength of the advertising packets and, if the master node 551 determines that the signal strength is decreasing over time, the master node 551 will issue an alert either locally (e.g., through a speaker component of the master node 551) or to the server.

Figure 9D:
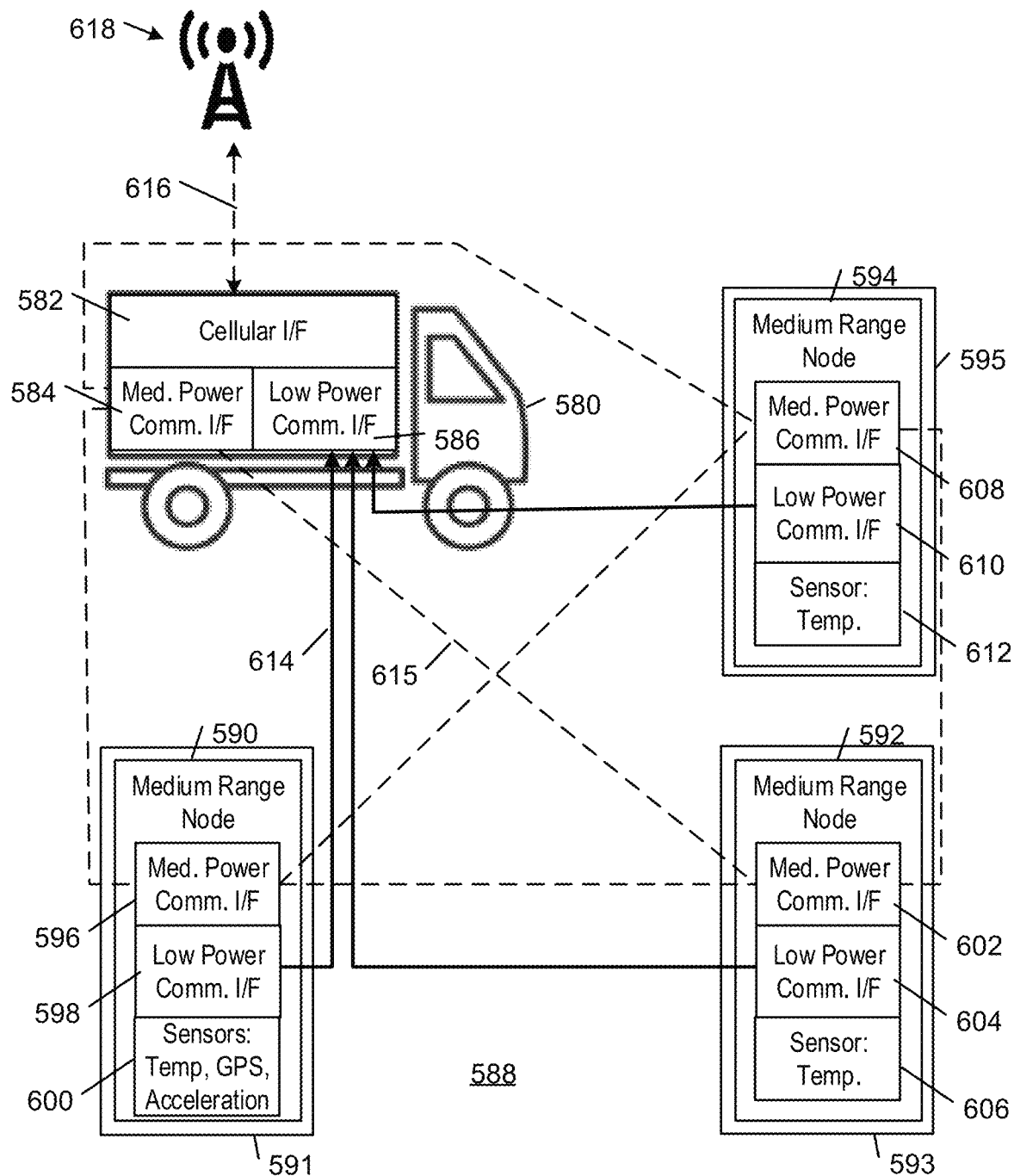

Referring to FIG. 9D, a truck 580 is configured as a mobile node or mobile hub that includes a cellular communications interface 582, a medium power communications interface 584, and a low power communications interface 586. The communications interfaces 580-586 may be implemented on one or more tape and non-tape nodes such as tape node 134 of FIG. 5C. In an illustrative scenario, the truck 580 visits a storage facility, such as a warehouse 588, to wirelessly obtain temperature data generated by temperature sensors in the medium range nodes 590, 592, 594. The warehouse 588 contains nodes 590, 592, and 594 that are associated with respective packages 591, 593, 595. In the illustrated embodiment, each node 590-594 is a medium range node that includes a respective medium power communications interface 596, 602, 608, a respective low power communications interface 598, 604, 610 and one or more respective sensors 600, 606, 612. In the illustrated embodiment, each of the package nodes 590, 592, 594 and the truck 580 is connected to each of the other ones of the package nodes through a respective medium power communications path (shown by dashed lines). In some embodiments, the medium power communications paths are LoRa formatted communication paths. Package nodes 590, 592 and 594 may be examples of tape node 132 of FIG. 5B.

In some embodiments, the communications interfaces 584 and 586 (e.g., a LoRa communications interface and a Bluetooth Low Energy communications interface) on the node on the truck 580 is programmed to broadcast advertisement packets to establish connections with other network nodes within range of the truck node. A warehouse 588 includes medium range nodes 590, 592, 594 that are associated with respective packages 591, 593, 595 (e.g., packages, boxes, pallets, and the like). When the truck node's low power interface 586 is within range of any of the medium range nodes 590, 592, 594 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 590, 592, 594, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 614 or a LoRa formatted communication path 615), the truck node determines the identity information for the medium range node 590 (e.g., a peripheral node), the medium range node's capabilities include retrieving temperature data, and the medium range node's services include transmitting temperature data to other nodes. Depending of the size of the warehouse 588, the truck 580 initially may communicate with the nodes 590, 592, 594 using a low power communications interface (e.g., Bluetooth Low Energy interface). If any of the anticipated nodes fails to respond to repeated broadcasts of advertising packets by the truck 580, the truck 580 will try to communicate with the non-responsive nodes using a medium power communications interface (e.g., LoRa interface). In response to a request from the medium power communications interface 584, the medium range node 590 transmits an indication of its measured temperature data to the truck node. The truck node repeats the process for each of the other medium range nodes 592, 594 that generate temperature measurement data in the warehouse 588. The truck node reports the collected (and optionally processed, either by the medium range nodes 590, 592, 594 or the truck node) temperature data to a server over a cellular communication path 616 with a cellular network 618.

Figure 9E:
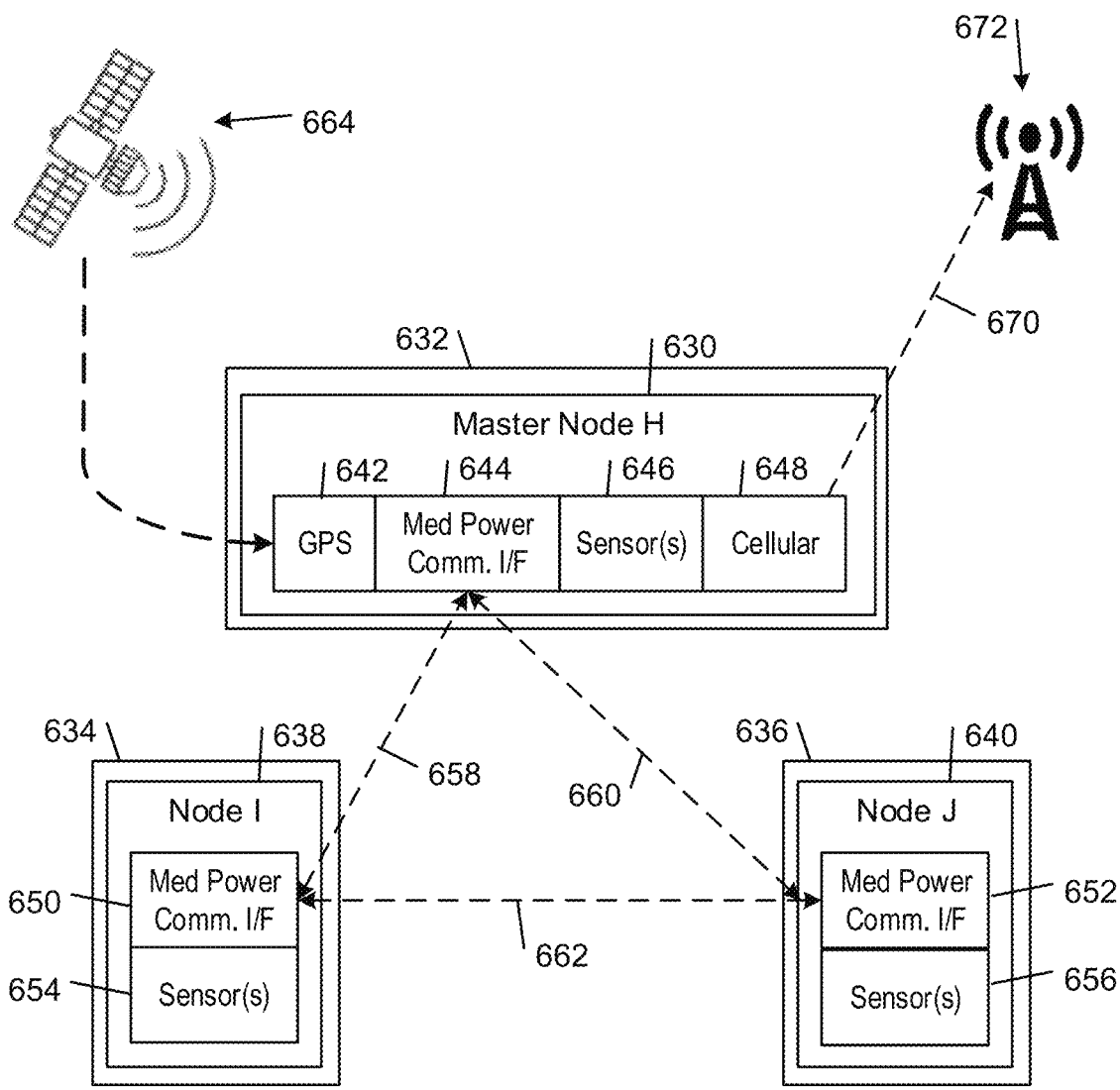

Referring to FIG. 9E, a master node 630 is associated with an item (e.g., a package 632) and grouped together with (e.g., packages 634, 636) that are associated with respective peripheral nodes 638, 640. The master node 630 includes a GPS receiver 642, a medium power communications interface 644, one or more sensors 646, and a cellular communications interface 648. Each of the peripheral nodes 638, 640 includes a respective medium power communications interface 650, 652 and one or more respective sensors 654, 656. In the illustrated embodiment, the peripheral and master nodes are connected to one another other over respective pairwise communications paths (shown by dashed lines). In some embodiments, master node 630 and peripheral nodes 638, 640 communicate through respective LoRa communications interfaces over LoRa formatted communications paths 658, 660, 662. Master node 630 may be an example of tape node 135 and peripheral nodes 638, 640 may be examples of tape node 132 of FIGS. 5B-5C.

In the illustrated embodiment, the master node 630 and peripheral nodes 638, 640 include environmental sensors for obtaining information regarding environmental conditions in the vicinity of the associated packages 632, 634, 636. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 630 periodically broadcasts advertising packets in the surrounding area. When the peripheral nodes 638, 640 are within range of master node 630, and are operating in a listening mode, the peripheral nodes 638, 640 will extract the address of master node 630 and potentially other information (e.g., security information) from the advertising packets. If, according to their respective programmatic code, the peripheral nodes 638, 640 determine that they are authorized to connect to the master node 630, the peripheral nodes 638, 640 will attempt to pair with the master node 630. In this process, the master node 630 and the peripheral nodes 638, 640 determine each other's identities, capabilities, and services. For example, after successfully establishing a respective communication path 658, 660 with each of the peripheral nodes 638, 640 (e.g., a LoRa formatted communication path), the master node 630 determines certain information about the peripheral nodes 638, 640, such as their identity information (e.g., peripheral nodes), their capabilities (e.g., measuring temperature data), and their services include transmitting temperature data to other nodes.

After establishing LoRa formatted communications paths 658, 660 with the peripheral nodes 638, 640, the master node 630 transmits requests for the peripheral nodes 638, 640 to transmit their measured and/or locally processed temperature data to the master node 630.

In the illustrated embodiment, the master node 630 can determine its own location based on geolocation data transmitted by a satellite-based radio navigation system 664 (e.g., GPS, GLONASS, and NAVSTAR) and received by the GPS receiver 642 component of the master node 630. In an alternative embodiment, the location of the master node 630 can be determined using cellular based navigation techniques that use mobile communication technologies (e.g., GSM, GPRS, CDMA, etc.) to implement one or more cell-based localization techniques. After the master node 630 has ascertained its location, the distance of each of the packages 634, 636 from the master node 630 can be estimated based on the average signal strength of the advertising packets that the master node 630 receives from the respective peripheral node. The master node 630 can then transmit its own location and the locations of the package nodes H, I and J to a server over a cellular interface connection with cellular network 672. Other methods of determining the distance of each of the packages 634, 636 from the master node 630, such as Received Signal-Strength Index (RSSI) based indoor localization techniques, also may be used.

In some embodiments, after determining its own location and the locations of the peripheral nodes, the master node 630 reports the location data and the collected and optionally processed (e.g., either by the peripheral nodes peripheral nodes 638, 640 or the master node 630) sensor data to a server 404 over a cellular communication path 670 on a cellular network 672.

Figure 10A:
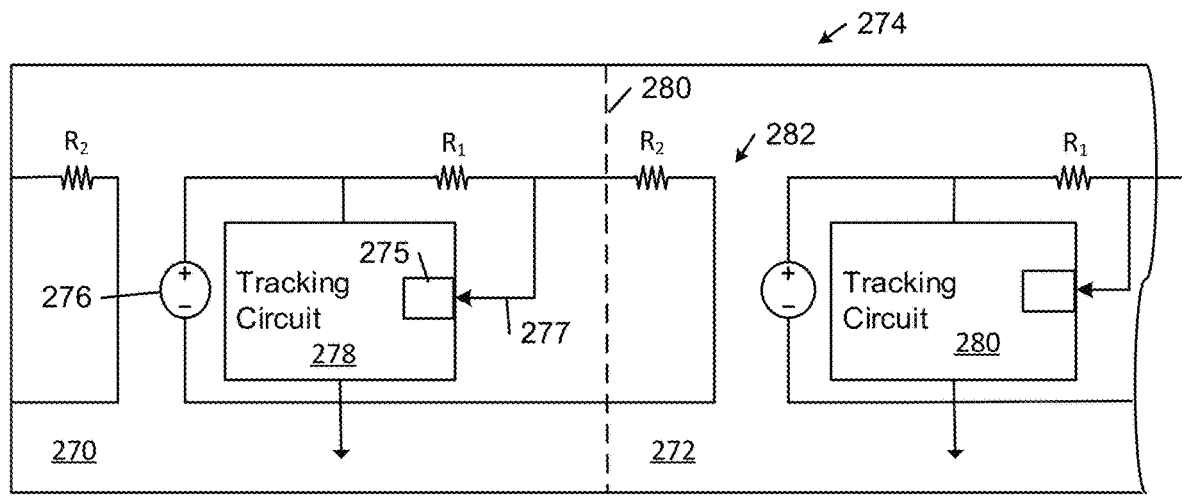
FIG. 10A-B are diagrammatic top views of a length of an example tracking adhesive product, in embodiments.

Referring to FIG. 10A, in some examples, each of one or more of the segments 270, 272 of a tracking adhesive product 274 includes a wake circuit 275 that delivers power from the energy source 276 to the tracking circuit 278 (e.g., a processor and one or more wireless communications circuits) in response to an event. Tracking circuit 278 is an example of any of the wireless transducing circuits disclosed herein including wireless transducing circuits 14, 34, 70 or 106. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment 270 from segment 272, for example, by cutting across the tracking adhesive product 274 at a designated location (e.g., along a designated cut-line 280). In particular, in its initial, un-cut state, a minimal amount of current flows through the resistors $R_1$ and $R_2$. As a result, the voltage on the wake node 277 remains below the threshold turn-on level. After the user cuts across the tracking adhesive product 274 along the designated cut-line 280, the user creates an open circuit in the loop 282, which pulls the voltage of the wake node above the threshold level and turns on the wake circuit 275. As a result, the voltage across the energy source 276 will appear across the tracking circuit 278 and, thereby, turn on the segment 270. In particular embodiments, the resistance value of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of a tracking adhesive product includes a sensor and a wake circuit that delivers power from the energy source to the one or more of the tracking circuit 278 in response to an output of the sensor. In some examples, the sensor is a strain sensor that produces a wake signal based on a change in strain in the segment. In some of these examples, the strain sensor is affixed to a tracking adhesive product and configured to detect the stretching of the tracking adhesive product segment as the segment is being peeled off a roll or a sheet of the tracking adhesive product. In some examples, the sensor is a capacitive sensor that produces a wake signal based on a change in capacitance in the segment. In some of these examples, the capacitive sensor is affixed to a tracking adhesive product and configured to detect the separation of the tracking adhesive product segment from a roll or a sheet of the tracking adhesive product. In some examples, the sensor is a flex sensor that produces a wake signal based on a change in curvature in the segment. In some of these examples, the flex sensor is affixed to a tracking adhesive product and configured to detect bending of the tracking adhesive product segment as the segment is being peeled off a roll or a sheet of the tracking adhesive product. In some examples, the sensor is a near field communications sensor that produces a wake signal based on a change in inductance in the segment.

Figure 10B:
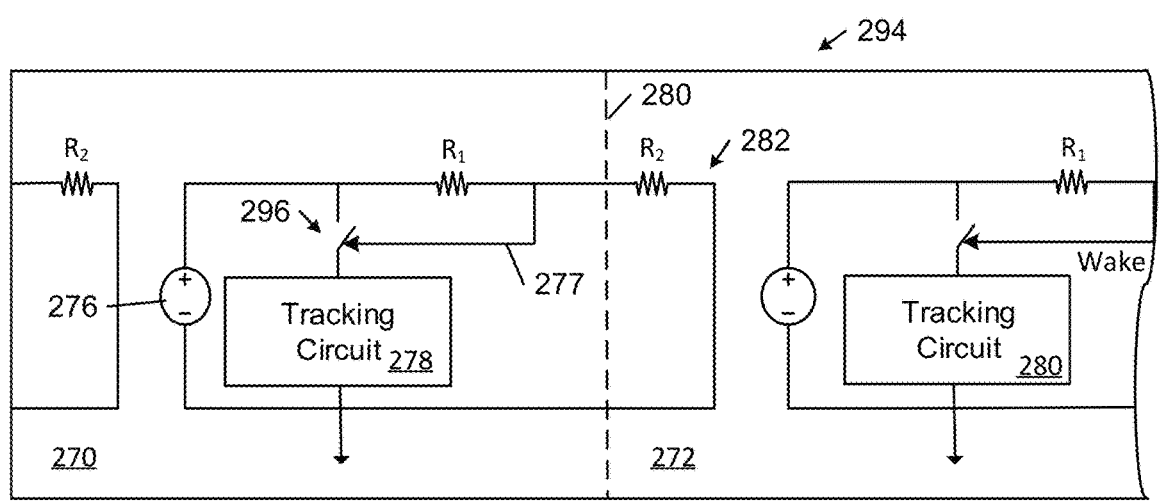

FIG. 10B shows another example of a tracking adhesive product 294 that delivers power from the energy source 276 to the tracking circuit 278 (e.g., a processor and one or more wireless communications circuits) in response to an event. This example is similar in structure and operation as the tracking adhesive product 294 shown in FIG. 10A, except that the wake circuit 275 is replaced by a switch 296 that is configured to transition from an open state to a closed state when the voltage on the switch node 277 exceeds a threshold level. In the initial state of the tracking adhesive product 294, the voltage on the switch node is below the threshold level as a result of the low current level flowing through the resistors $R_1$ and $R_2$. After the user cuts across the tracking adhesive product 294 along the designated cut-line 280, the user creates an open circuit in the loop 282, which pulls up the voltage on the switch node above the threshold level to close the switch 296 and turn on the tracking circuit 278.

A wireless sensing system includes one or more tape nodes, or segments, having specialized form factors configured to collect sensor data in hostile environments. A variety of assets must be maintained in particular conditions in order to maintain the quality or safety requirements for the asset. Often, these conditions must be maintained even when the asset is in a hostile environment that varies greatly in some degree from the particular conditions for the asset. For example, medical assets may be maintained at temperatures between −50° C. and −15° C. during transport and may be sensitive to temperatures outside of that range so an environmental temperature of 50° C. would qualify as a hostile environment. In other examples, assets may be exposed to conditions of high heat or extreme cold, radiation, light exposure, high vibration, or electromagnetic fields preventing connection or communication, may be exposed to high and/or low pressure (e.g., air pressure or water pressure), or may be inaccessible to conventional sensors due to shapes or other qualities of assets. Assets may pose chemical or explosive risks, requiring specific processes for handling.

A tape node is a wireless communications and transducer platform that may be deployed into various applications and workflows to provide functions such as sensing and asset management. Some or all of a tape node may include a flexible substrate with an adhesive layer for seamless and unobtrusive deployment.

Tape nodes may be designed to operate in ambient conditions. As used herein, an ambient environment includes one in which most electronic components may function without additional protective measures. Manufacturers of electronics components such as processors, wireless communication interfaces, batteries and sensors specify Recommended Operating Conditions (ROC) for their products. Most commonly used, low-cost electronics components have an ROC corresponding to the ambient environment. An ambient environment may also be understood as an environment approximately conducive to human life. An ambient environment may also be a relative term defined by the gap between the required conditions for maintaining/using an asset and the conditions external to the asset.

Specialized form factors may be needed for tape nodes to operate in a hostile environment. In embodiments, a hostile environment is generally one that is outside the ROC of many electronics components. A hostile environment may also include assets that require a tape node to fit into narrow areas that conventional sensors are unable to reach. Tape nodes may include sensors for monitoring a hostile environment and providing sensor data to other tape nodes or computer systems. In embodiments, sensors may detect temperature, vibration, moisture, and other characteristics of the hostile environment. In a further embodiment, light sensors may be used for tamper detection, for example, be detection when a package has been opened.

For any hostile environment, the portion of the tape node that is positioned inside the hostile environment may be resistant to the hostile environment using a variety of techniques. For example, sealing, encapsulating, a thicker substrate or padding to absorb shock may be used alone or in combination. Other forms of protection are contemplated such as heat-resistant or chemical-resistant materials or coatings. The portion of the tape node that is inside the hostile environment may be reinforced with steel plating, extra structure elements like wiring or a firm casing. Electronics components may be hermetically sealed against moisture or other types of exposure.

The specialized form factors comprise, for example, a specialized shape such that the tape node is able to fit into narrow areas or corners of assets that conventional sensors are unable to reach. In other examples, specialized form factors are shaped such that portions or components of the tape nodes capable of withstanding hostile environments (e.g., sensors) to interface directly with the hostile environment and capture accurate sensor data, while other portions or components of the tape node (e.g., delicate electronic components, communications systems) do not interface with the hostile environment. In an embodiment, a specialized form factor comprises two portions and further is shaped or notated to guide a user of the specialized form factor to manipulate the tape node in such a way that electronic components, batteries, PCB boards, or other sensitive components are not bent or broken during deployment. In an embodiment, a specialized form factor further or instead comprises a shape or notation to guide a user of the specialized form factor to place the form factor such that sensitive components are not in hostile environments.

In some embodiments, tape nodes with specialized form factors have separate or additional communications systems, protective cases or coatings, thicker components, additional battery power, or other modifications to accurately capture sensor data in hostile environments while ensuring that electronic components are not damaged by the hostile environments.

FIGS. 11A-11F illustrate embodiments of tape nodes, with specialized form factors. Any of the tape nodes illustrated in FIGS. 11A-11F may be an example of tape nodes 130, 132 or 134 of FIGS. 5A-5C or any of the segments or tape nodes discussed herein. These tape nodes as discussed below generally include a first portion including a first fraction of the tape node length and supporting electronic components configured to operate within an ambient environment, a second portion including a second fraction of the length of the tape node and supporting electronic components configured to operate within a hostile environment; and a flexible connecting portion comprising a remaining fraction of the length of the substrate and configured to physically connect the first portion and the second portion.

Figure 11A:
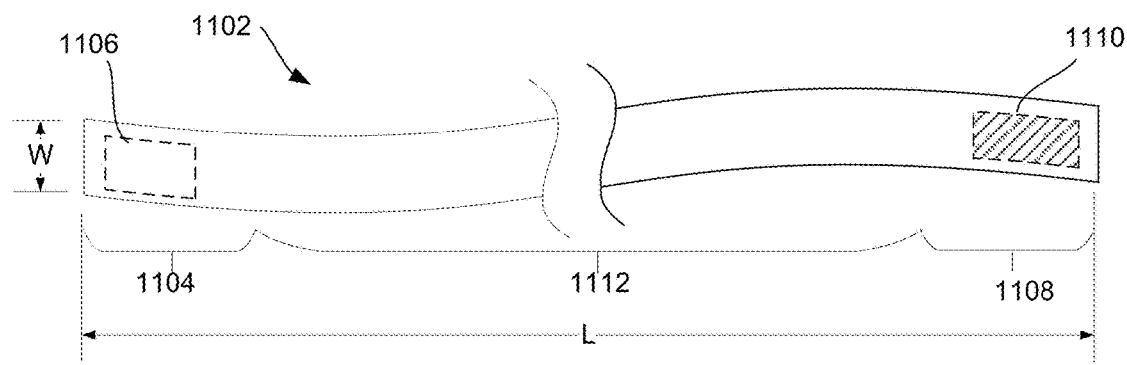
FIGS. 11A-11F illustrate embodiments of tape nodes with specialized form factors to capture sensor data in hostile environments, in embodiments.

FIG. 11A shows an example illustration of a tape node 1102 with a specialized form factor. In embodiments, tape node 1102 includes a flexible substrate as describe above for tape nodes 130, 132 and 134. First portion 1104 supports electronics components 1106 that are configured to operate in an ambient environment. Second portion 1108 supports electronics components 1110 that are configured to operate in a hostile environment. Flexible connecting portion 1112 connects first portion 1104 and second portion 1108. In embodiments, flexible connecting portion 1112 may include a wired connection between electronics components 1106 and 1110.

In embodiments, electronics component 1110 may include a wireless communication antenna and interface connected to sensors for monitoring the hostile environment. Electronics component 1106 may include a compatible wireless communication antenna and interface so that electronics components 1106 and 1110 can communicate wirelessly. In embodiments, communication protocols such as Bluetooth, Zigbee or ultra-wideband (UWB) may be used.

In embodiments, tape node 1102 has an overall length L and width W. First portion 1104, second portion 1108 and flexible connection portion 1112 each encompass a fraction of length L. In embodiments, the fraction of length L devoted to flexible connection portion 1112 should be long enough to allow second portion 1108 to be placed in the hostile environment to collect sensor data while placing first portion 1104 in the ambient environment so electronic components 1106 are not damaged by the hostile environment. In embodiments, portions 1104, 1108 and 1112 may be approximately equal. In other embodiments, the fraction of length L devoted to flexible connection portion 1112 may be 50% or more. First portion 1104, second portion 1108 and flexible connection portion 1112 may or may not include an adhesive layer such as adhesive layer 112 of FIGS. 5A-5C.

The tape node 1102 may be adhered or affixed to an asset such that second portion 1108 is within or in contact with the hostile environment and first portion 1104 is outside of or not in contact with the hostile environment, enabling the sensors to capture data while protecting electronics components 1106 of the tape node that are in the first portion 1104, which may include components that are sensitive to the hostile environment. For example, first portion 1104 (and specifically electronic components 1106) may include embodiments of the processor 90, the memory 96, the energy storage component 92, one or more of the communication interfaces 81, 85, 87, other components or some combination thereof. First portion 1104 may also include one or more sensors that are configured to collect sensing data relevant to the area outside of the hostile environment.

Figure 11B:
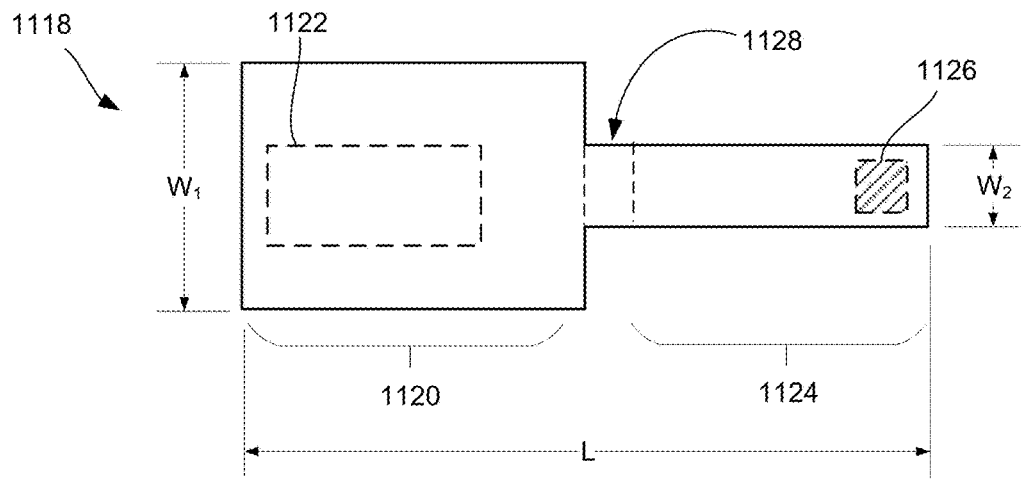

FIG. 11B shows an example illustration of tape node 1118 with a specialized form factor where its width varies over its length. First portion 1120 supports electronics components 1122 that are configured to operate in an ambient environment. Second portion 1124 supports electronics components 1126 that are configured to operate in a hostile environment. Electronics components 1122 and 1126 are examples of electronics components 1106 and 1100. Flexible connection portion 1128 is generally the area between the dashed lines. Either or both of first portion 1120 and second portion 1124 may have an adhesive backing.

In embodiments, first portion 1120 has a width $W_1$ that is larger than the width $W_2$ of second portion 1124. In embodiments, the ratio of $W_1$ to $W_2$ may be three to one (2:1) or less. Flexible connection portion 1128 allows second portion 1124 to be manipulated relative to first portion 1120 and inserted into a hole or gap as discussed below.

Figure 11C:
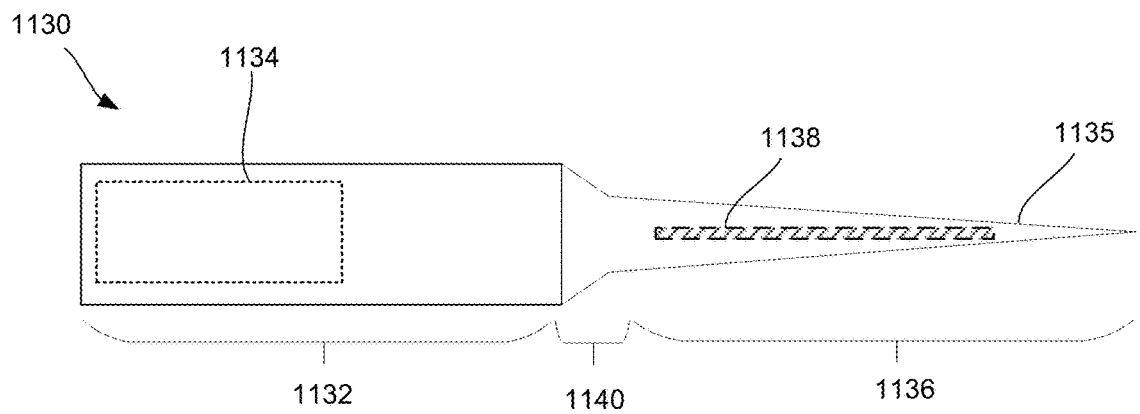

FIG. 11C shows an additional embodiment of tape node 118 as tape node 1130. First portion 1132 supports electronics components 1134 that are configured to operate in an ambient environment and may include a flexible substrate with an adhesive backing. Second portion 1136 may include a metal needle or probe 1035 containing electronics components 1138 and/or sensing components that can be inserted or fit into narrow spaces. Electronics components 1134 and 1136 are examples of electronics components 1106 and 1100. Flexible connection portion 1140 provides a transition between the width of first portion 1132 and that of second portion 1136 and also allows second portion 1136 to be manipulated for insertion into a hostile environment or a narrow opening. In embodiments, probe 1135 may have a blunt end. In some embodiments, probe 1135 may be a metal needle with a pointed end that may be used to penetrate an object, such as one that does not have a pre-existing opening.

Figure 11D:
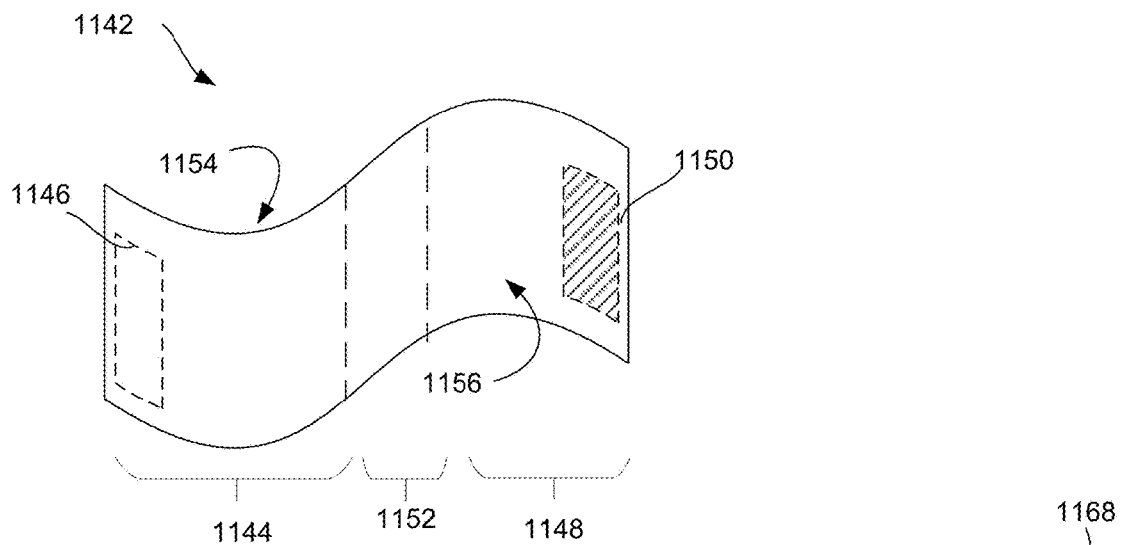

FIG. 11D is an example illustration of tape node 1142. In embodiments, tape node 1142 is an example of tape node 1102. First portion 1144 supports electronics components 1146 that are configured to operate in an ambient environment. Second portion 1148 supports electronics components 1150 that are configured to operate in a hostile environment. Electronics components 1146 and 1150 are examples of electronics components 1106 and 1100. Flexible connecting portion 1152 connects first portion 1144 and second portion 1148. A bottom surface 1154 of first portion 1144 may include an adhesive layer. In embodiments, a bottom surface of second portion 1148 may also include an adhesive layer and/or a top surface 1156 of second portion 1148 opposite the bottom surface may also include an adhesive layer to provide increased flexibility in positioning and securing tape node 1142.

Figure 11E:
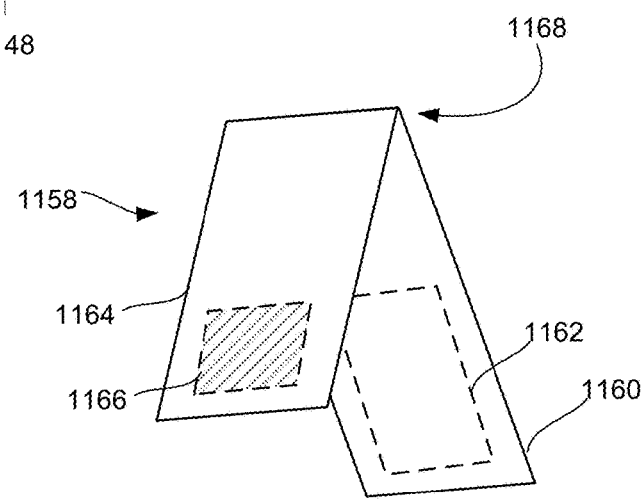

FIG. 11E is an example illustration of tape node 1158. In embodiments, tape node 1158 is an example of tape nodes 1102, 1118, 1130 or 1142. First portion 1160 supports electronics components 1162 that are configured to operate in an ambient environment. Second portion 1164 supports electronics components 1166 that are configured to operate in a hostile environment. Electronics components 1162 and 1164 are examples of electronics components 1106 and 1100. First portion 1160 and second portion 1164 may be bent towards each other at flexible connection portion 1168, such as shown in FIG. 11E. Tape node 1158 may bend in a range from 0 degrees to almost 180 degrees. In embodiments, flexible connection portion 1168 does not include any electronic components that are sensitive to bending, which allows for enhanced flexibility. In further embodiments, flexible connection portion 1168 includes electronic components such as flexible conductive traces or a flexible printed circuit board. Visible markings may be placed on the outside of tape node 1158 to provide guidance on where the tape node may be bent without damaging internal components.

Figure 11F:
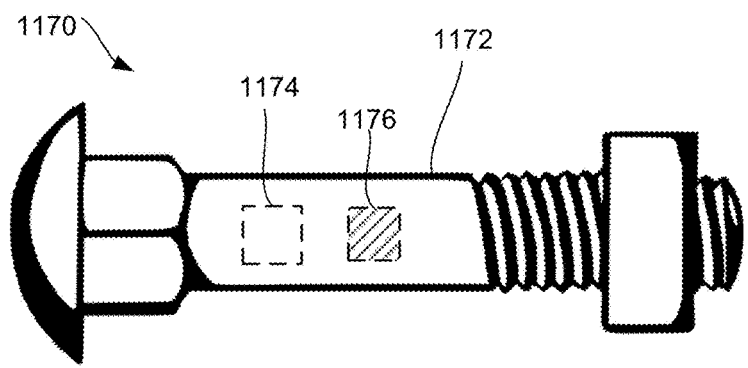

Other form factors capable of providing the electronics components and functions described herein while functioning in a hostile environment are contemplated. FIG. 11F is an example illustration of node 1170, which is an example of any of the tape nodes described herein. In some embodiments, node 1170 with a specialized form factor is a bolt with electronic components 1174, 1176 contained within the metal body 1172 of the bolt. Electronics components 1174 and 1176 are examples of electronics components 1106 and 1100. This form factor enables electronics components 1174, 1176 to withstand hostile environments, such as close proximity to burning oil.

In embodiments, any of the tape nodes disclosed herein may include a coupling element (e.g., a metal coin) that is coupled to a vibration or temperature sensor in the second portion of a tape node that is inserted into a hostile environment, such as the coupling elements disclosed in U.S. Ser. No. 17/468,645.

In some embodiments, a node encompassing the electronics components and functions described herein may be embodied as a smart sealant storing electronic components and sensors between two or more objects. For example, the specialized form factor is a wax, rubber, resin, or other sealant comprising a packet of electronic components and sensors applied to narrow spaces or angles between parts of an asset (e.g., along an angled portion of machinery) or between a stationary asset and a building structure.

Figure 11G:
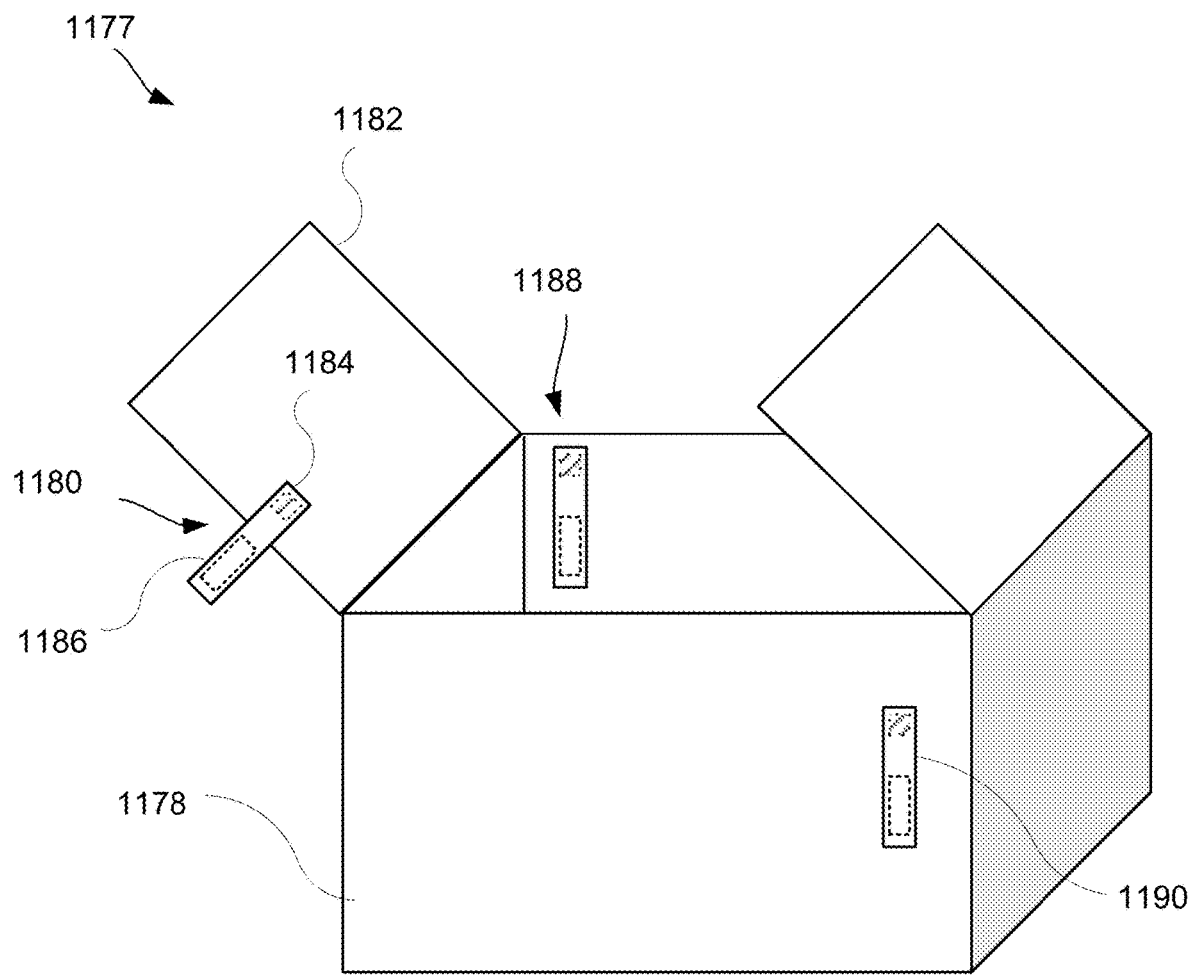
FIGS. 11G-11I show example illustrations of wireless sensing systems using any of the tape nodes of FIGS. 11A-11F, in embodiments.
Figure 11H:
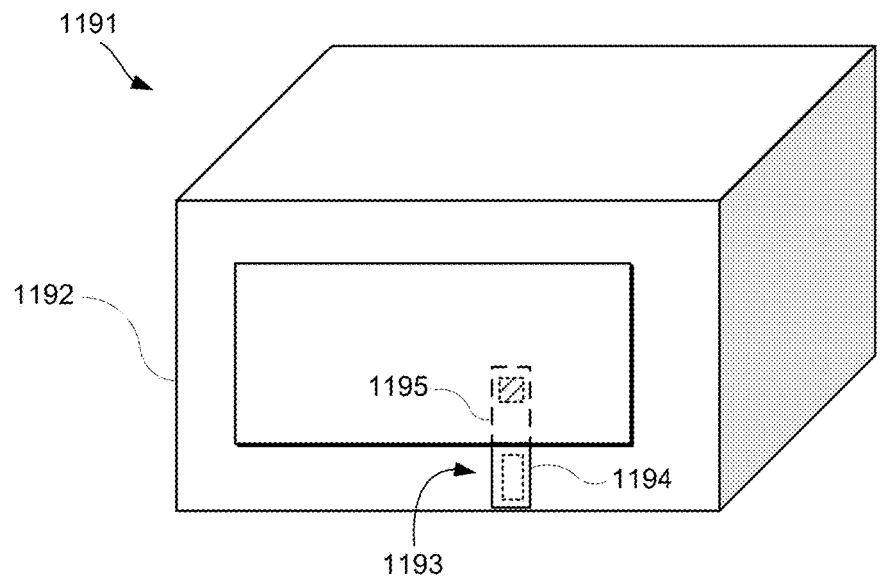
Figure 11I:
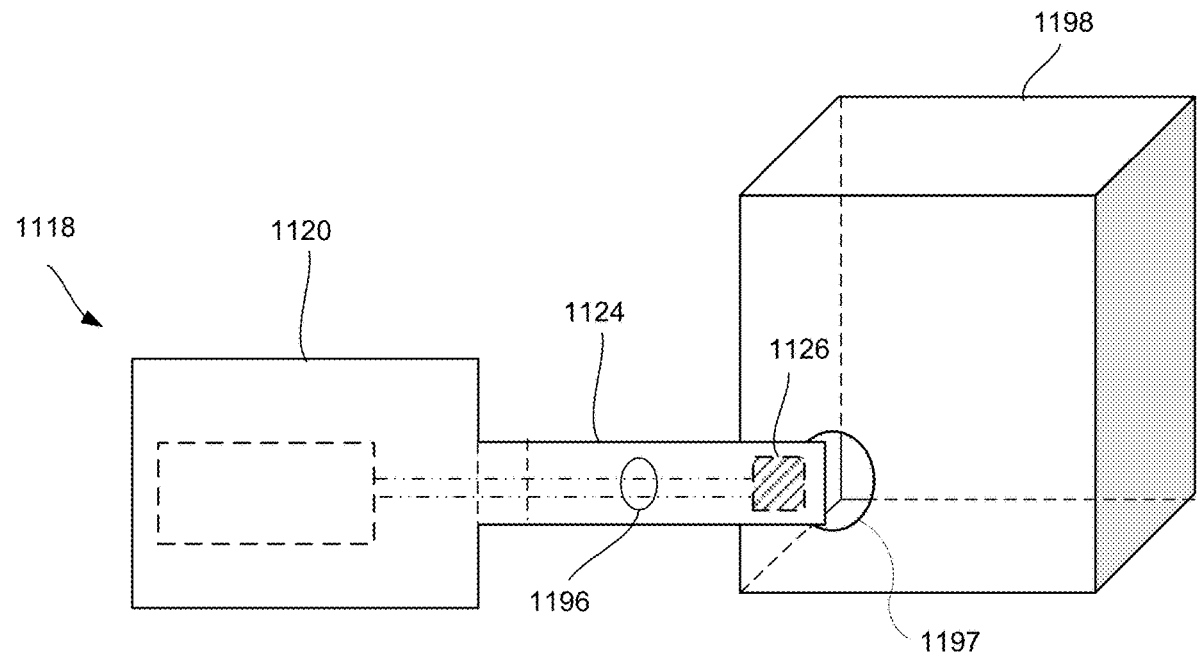

FIGS. 11G-11I show example illustrations of wireless sensing systems using any of the tape nodes disclosed herein. The wireless sensing systems of FIGS. 11G-11I may be encompassed within the wireless sensing system of FIG. 6. Tape nodes or other nodes as discussed in connection with FIG. 11F may include short range, medium range or long range communication devices.

FIG. 11G shows an example illustration of a wireless sensing system 1177 for capturing sensor data associated with a container 1178 for maintaining an asset at a predetermined condition. For example, container 1178 may be a container for transporting vaccines at low temperatures. In embodiments, container 1178 may be used for any product that must be maintained at a non-ambient temperature such as that provided by ice, dry-ice or some other refrigerant, for example. Heated containers are also contemplated. As shown in FIG. 11G, container 1178 is a box with flaps 1182 that opens. Alternatively, container 1178 may take a form similar to a pizza box with a single lid that opens. Other forms for container 1178 are contemplated. A wireless sensing system may include sensors for detecting a variety of conditions such as temperature, vibration, moisture and light, for example.

When used with container 1178, a tape node may be placed in a variety of positions. Tape node 1180 is shown adhered to the edge of flap 1182 of a lid of container 1178 so that the first portion 1186 is positioned outside of container 1178 when the container lid is closed. In embodiments, first portion 1186 can be bent around an edge of flap 1182 and adhered to the outside of the flap, such as shown in FIG. 11E, while second portion 1184 is on the inside of flap 1182 and thus, inside container 1178. Tape node 1180 may be an example of any of tape nodes 130, 132 or 134 of FIGS. 5A-5C. In embodiments, tape node 1180 may communicate with another tape node on the outside of container 1178 such as tape node 1190, a tape node located some distance away, or directly with a cellular or other communication network. In embodiments, second portion 1184 may include a temperature sensor inside container 1178, but other electronic components in first portion 1186 are outside of container 1178 so that they aren't exposed to the interior hostile environment such as cold temperature/moisture, etc. This allows tape node 1180 to simultaneously sense temperature with the sensor in second portion 1184 and perform wireless communication and real-time tracking with the comm system in the first portion 1186.

In another embodiment, tape node 1188 is specialized to withstand hostile environments and is adhered or affixed inside container 1178 to interface with the hostile environment (e.g., inside container 1178 or in an oven reaching high temperatures; in a freezer reaching low temperatures; in a chamber having high radiation or moisture levels). Tape node 1188 comprises one or more sensors for collecting sensor data within the hostile environment and may include wireless communications capability for communicating to a second tape node 1190. The one or more sensors may include, for example, a temperature sensor, an acoustics sensor, an optical sensor, an accelerometer, a vibration sensor, and the like.

Either of tape nodes 1180 or 1188 may communicate with tape node 1190. Tape node 1190 is adhered or affixed externally from the hostile environment (e.g., on the outside of container 1178 or the oven at an ambient temperature) and is configured to receive communications from tape node 1180 or 1188. In the example of FIG. 11G, tape node 1190 is adhered to an exterior surface of the container 1178. In other examples, tape node 1190 is adhered or affixed to a different surface (e.g., is a pluggable gateway or is adhered to a nearby surface). In some embodiments, tape node 1190 is further configured to store the received sensor data. In some embodiments, tape node 1190 is further configured to transmit the received sensor data to the wireless sensing system (e.g., one or more additional tape nodes within the wireless sensing system, a user device associated with the wireless sensing system, or the like). In other embodiments, tape node 1188 performs one or more of the functions of transmitting received sensor data to the wireless sensing system 1177. In other embodiments, tape nodes 1180, 1188 and/or 1190 may perform one or more additional calculations, determinations, transfers of data, and the like.

In some embodiments, where establishing a connection between tape nodes 1188 and 1190 is difficult in the hostile environment (e.g., due to electromagnetic interference), tape node 1188 is configured to store sensor data locally while within a hostile environment and to transmit the stored sensor data to tape node 1190 after a connection is re-established (e.g., upon exiting the hostile environment). For example, an electronic component may be able to withstand exposure to a hostile environment (temperature, moisture, etc.) but unable to operate while in the hostile environment. In this situation, the electronic component may be disabled while in the hostile environment, but reactivated upon exiting the hostile environment. In some embodiments, tape node 1188 is configured to store the sensor data locally for a set time interval or responsive to detecting a use mode (e.g., a tape node affixed to a stethoscope captures and stores sensor data during use in a specific context and communicates the data when it is no longer in that context).

FIG. 11H shows an embodiment of a wireless sensing system 1191 for use with an oven 1192. In embodiments, a tape node 1193 is adhered to an edge of an oven 1192 with first portion 1194 of the tape node attached or adhered to the outside of oven 1192 and second portion 1195 of the tape node attached or adhered to the inside of oven 1192 when the oven door is closed.

In some embodiments, second portions of any of the tape nodes disclosed herein transmit captured sensor data in real time to the respective first portions, and then to a gateway, cloud, or server of the wireless sensing system, or to another entity of the wireless sensing system as described above in connection with FIGS. 6, 7, 8 and 9A-9E. In other embodiments, second portions of any of the tape nodes disclosed here may store captured sensor data and transmit the stored sensor data to first portions of the tape nodes, to a gateway, cloud, or server of the wireless sensing system, or to another entity of the wireless sensing system upon removal from the hostile environment (e.g., responsive to a temperature reading by the temperature sensor indicating ambient or room temperature). In some embodiments, tape nodes may perform one or more computations or additional actions prior to communicating sensor data to a gateway, cloud, or server of the wireless sensing system.

In the example embodiment of FIG. 11I, a tape node 1118 of FIG. 11B with a specialized form factor is configured such that a narrow second portion 1124 can be threaded into an opening 1197 such as a hole, port, narrow space, channel, or other part of an asset 1198. A wider first portion 1120 rests outside of opening 1197 and may be attached or affixed to the outside of asset 1198. The second portion 1124 of tape node 1118 comprises one or more electronics components 1126 which may be sensors configured to capture sensor data inside of the asset 1198. The wider first portion 1120 comprises one or more electronic components 1122 connected via conductive traces 1196 to the one or more sensors. In some examples, the tape node 1118 is adhered or affixed to the asset 1198, e.g., by an adhesive side of the tape node. In other examples, the tape node 1118 is threaded through opening 1197 of the asset and is sealed into the opening 1197 using epoxy resin or another sealant.

In an embodiment, a tape node with a specialized form factor comprises one or more sensors remote from a communications system of the node, wherein the one or more sensors are connected to the communications system using a narrow, flat section of the form factor. In some embodiments, the one or more sensors may be electrically connected to the other components of the tape node by conductive traces or wires. The conductive traces or wires may be flexible.

In some embodiments, tape nodes with specialized form factors comprise low range communications systems. Because low range communications systems require less power to function, tape nodes with specialized form factors are able to optimize power usage for sensor data collection within the hostile environment. When the tape node is removed from the hostile environment or during use in a hostile environment, the tape node is configured to communicate with another tape node external to the hostile environment and having a higher range communications system (e.g., a nearby gateway or device associated with the wireless sensing system). This way, the sensor data can be relayed to other nodes, devices, and/or servers of the wireless sensing system. In some embodiments, the tape node communicates with the other tape node external to the hostile environment while the tape node is still inside of the hostile environment.

In embodiments, any of the tape nodes discussed herein may operate in low power mode when inside the hostile environment, then activate a high power mode when removed from the hostile environment. This activation may be automatically detected based on sensor data detected by the tape node. In embodiments, either activating the tape node or switching from low power to high power modes could be based on location data or detecting that a communications network has become available. In further embodiments, a change in activation of a tape node may be based on a schedule for when it's removed from the hostile environment. A nearby wireless node may be configured to broadcast a general or targeted signal that tells a tape node wholly or partially contained in a hostile environment when it has been removed. In embodiments, a user on a client device may use an app to tell the tape node that it has been removed from a hostile environment.

In some embodiments, the electronic components of a tape node include a wireless interface for communication with cellular or satellite communication systems. The tape node may function in a variety of modes to manage battery life. For example, real-time tracking may entail having the wireless interface on the outside portion of a container or enclosure update the server continuously or periodically. In another embodiment, event-based logic may be used to activate the wireless interface where it may be deactivated or in a sleep mode when the sensor data is not in a critical range, but wake up when the sensor data is indicative of an event that requires communication. Activation and deactivation may be based on other events such as removal from the hostile environment or GPS signals, for example.

Figure 12:
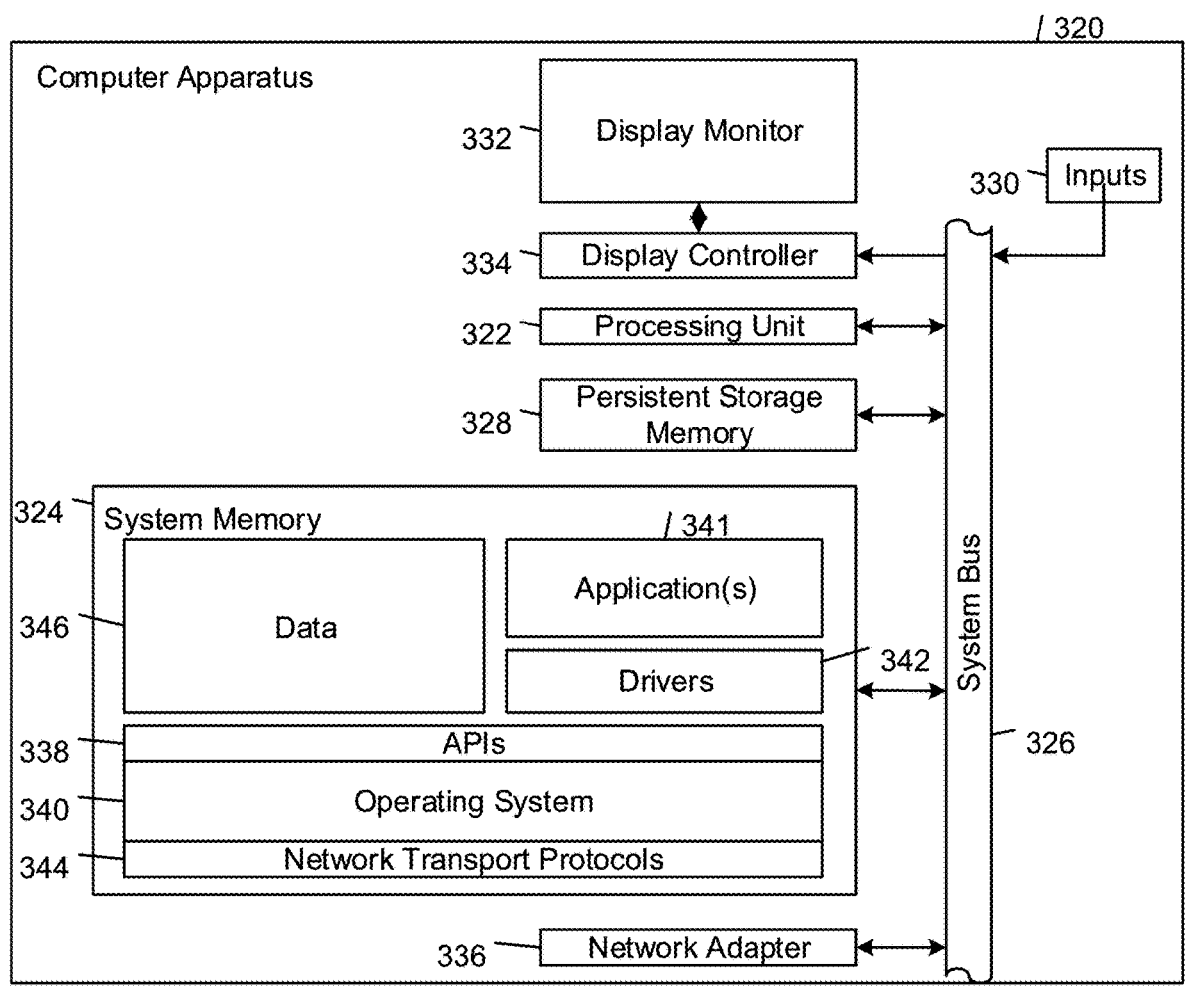
FIG. 12 is a block diagram of an example computer apparatus, in embodiments.

FIG. 12 shows an example embodiment of computer apparatus 320 that, either alone or in combination with one or more other computing apparatuses, is operable to implement one or more of the computer systems described in this specification.

The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random-access memory (RAM). The system bus 326 may be a memory bus, a peripheral bus or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Washington U.S.A.), software applications 341 including one or more software applications programming the computer apparatus 320 to perform one or more of the steps, tasks, operations, or processes of the locationing and/or tracking systems described herein, drivers 342 (e.g., a GUI driver), network transport protocols 344, and data 346 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

What is claimed is:

1. A sensor product for hostile environments, comprising:
a substrate configured to support electronic components and having:
(a) a first portion comprising a first fraction of a length of the substrate and supporting electronic components configured to operate within an ambient environment;
(b) a second portion comprising a second fraction of the length of the substrate and supporting electronic components configured to operate within a hostile environment; and
(c) a flexible connecting portion comprising a remaining fraction of the length of the substrate and configured to physically connect the first portion and the second portion,
wherein the flexible connecting portion electrically connects the first and second portions and the hostile environment comprises environmental conditions outside of recommended operating conditions (ROC) for one or more of the electronic components of the first portion.

2. The product of claim 1, wherein the electronic components configured to operate within the ambient environment further comprise one or more processing components.

3. The product of claim 2, wherein the electronic components configured to operate within the ambient environment further comprise one or more communications components.

4. The product of claim 1, wherein the electronic components configured to operate within the hostile environment further comprise one or more sensors configured to capture sensor data.

5. The product of claim 4, wherein the one or more sensors comprise a temperature sensor, an acoustics sensor, an optical sensor, an accelerometer, or a vibration sensor.

6. The product of claim 4, wherein the electronic components configured to operate within the hostile environment further comprise a low-power communications component.

7. The product of claim 1, wherein the substrate comprises a flexible substrate with top and bottom surfaces and comprises an adhesive layer on the bottom surface in the first portion.

8. The product of claim 7, wherein the substrate also comprises an adhesive layer on the bottom surface or on the top surface in the second portion.

9. The product of claim 1, wherein the flexible connecting portion is configured to operate in both the ambient and hostile environments.

10. The product of claim 1, wherein a width of the second portion is less than a width of the first portion.

11. The product of claim 1, wherein second portion is a metal probe and the flexible connection portion provides a transition between the first portion and the metal probe.

12. The product of claim 1, wherein the second portion is configured to be resistant to the hostile environment.

13. The product of claim 12, wherein the substrate comprises one or more of a heat-resistant material, a chemical-resistant material, a reinforcing material and a padding.

14. The product of claim 1, wherein the hostile environment comprises one or more of high temperatures, low temperatures, radiation, light exposure, high vibration, high air pressure, low air pressure, water, high water pressure, low water pressure humidity, electromagnetic fields or electrical interference, chemical or explosive risks, or a vacuum.

15. The product of claim 14, wherein the hostile environment comprises a a container for maintaining an asset in the hostile environment, the first portion of the substrate is adhered to an external surface of the container, and the second portion of the substrate is adhered to an internal surface of the container.

16. The product of claim 1, wherein the flexible connecting portion is configured to bend, be closed in a door, inserted through an opening, or epoxied in place.

17. A wireless sensing system, comprising:
a first tape node configured to operate within a hostile environment, the first tape node comprising a substrate configured to support electronic components and having:
(a) a first portion comprising a first fraction of a length of the substrate and supporting electronic components and a first wireless communications device configured to operate within an ambient environment;
(b) a second portion comprising a second fraction of the length of the substrate and supporting electronic components configured to operate within a hostile environment; and
(c) a flexible connecting portion comprising a remaining fraction of the length of the substrate and configured to physically connect the first portion and the second portion; and
a second tape node configured to operate within ambient conditions, the second tape node comprising a second wireless communications device configured to receive transmissions from the first wireless communications device, wherein the hostile environment comprises environmental conditions outside of recommended operating conditions (ROC) for one or more of the electronic components of the first portion of the first tape node.

18. The wireless sensing system of claim 17, wherein the first tape node further comprises one or more sensors and a memory for storing data collected by the one or more sensors when the hostile environment prevents the first wireless communications device from sending transmissions to the second wireless communications device.

19. The wireless sensing system of claim 17, wherein the first and second wireless communications devices provide low-range wireless communications, and the second tape node further comprises a third wireless communications device for transmitting, to a network service, transmissions received by the second wireless communications device from the first wireless communications device.

20. The wireless sensing system of claim 17, wherein the first tape node is positioned at a first location inside of the hostile environment, and the second tape node is positioned at a second location different from the first location that is outside of the hostile environment.

* * * * *